US012566967B2

(12) United States Patent
Du et al.

(10) Patent No.: US 12,566,967 B2
(45) Date of Patent: Mar. 3, 2026

(54) TRAINING METHOD FOR SEMI-SUPERVISED LEARNING MODEL, IMAGE PROCESSING METHOD, AND DEVICE

(71) Applicant: HUAWEI TECHNOLOGIES CO., LTD., Guangdong (CN)

(72) Inventors: Zewei Du, Beijing (CN); Hengtong Hu, Shenzhen (CN); Lingxi Xie, Beijing (CN); Qi Tian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 329 days.

(21) Appl. No.: 18/173,310

(22) Filed: Feb. 23, 2023

(65) Prior Publication Data

US 2023/0196117 A1     Jun. 22, 2023

Related U.S. Application Data

(63) Continuation of application No. PCT/CN2021/102726, filed on Jun. 28, 2021.

(30) Foreign Application Priority Data

Aug. 31, 2020    (CN) .......................... 202010899716.5

(51) Int. Cl.
  *G06N 3/0895*       (2023.01)
  *G06V 10/771*       (2022.01)
        (Continued)

(52) U.S. Cl.
  CPC ......... *G06N 3/0895* (2023.01); *G06V 10/771* (2022.01); *G06V 10/7753* (2022.01); *G06V 10/82* (2022.01)

(58) Field of Classification Search
  None
  See application file for complete search history.

(56) References Cited

U.S. PATENT DOCUMENTS

| | | | | |
|---|---|---|---|---|
| 10,585,986 B1 * | 3/2020 | Bhutani | ................. | G06F 16/35 |
| 11,068,781 B2 * | 7/2021 | Laine | .................... | G06N 3/088 |
| | (Continued) | | | |

FOREIGN PATENT DOCUMENTS

| | | |
|---|---|---|
| CN | 104318242 A | 1/2015 |
| CN | 106548190 A | 3/2017 |
| | (Continued) | |

OTHER PUBLICATIONS

Mendel et al., "Semi-supervised Segmentation Based on Error-Correcting Supervision," Springer Nature Switzerland AG 2020, A. Vedaldi et al. (Eds.): ECCV 2020, LNCS 12374, pp. 141-157, 2020. https://doi.org/10.1007/978-3-030-58526-6_9 (Year: 2020).*

(Continued)

*Primary Examiner* — Soo Shin
(74) *Attorney, Agent, or Firm* — WOMBLE BOND DICKINSON (US) LLP

(57) ABSTRACT

Embodiments of this application disclose a training method for a semi-supervised learning model which can be applied to computer vision in the field of artificial intelligence. The method includes: first predicting classification categories of some unlabeled samples by using a trained first semi-supervised learning model, to obtain a prediction label; and determining whether each prediction label is correct in a one-bit labeling manner, and if prediction is correct, obtaining a correct label (a positive label) of the sample, or if prediction is incorrect, excluding an incorrect label (a negative label) of the sample. Then, in a next training phase, a training set (a first training set) is reconstructed based on the information, and an initial semi-supervised learning model is retrained based on the first training set, to improve (Continued)

prediction accuracy of the model. In one-bit labeling, an annotator only needs to answer "yes" or "no" for the prediction label.

30 Claims, 15 Drawing Sheets

(51) Int. Cl.
    *G06V 10/774*     (2022.01)
    *G06V 10/82*     (2022.01)

(56) References Cited

U.S. PATENT DOCUMENTS

| | | | |
|---|---|---|---|
| 2018/0165554 A1* | 6/2018 | Zhang | G06N 3/045 |
| 2019/0117181 A1* | 4/2019 | Ishii | A61B 6/487 |
| 2019/0122120 A1 | 4/2019 | Wu et al. | |
| 2020/0090002 A1* | 3/2020 | Zhu | G06N 3/047 |
| 2021/0281592 A1* | 9/2021 | Givental | G06N 20/10 |

FOREIGN PATENT DOCUMENTS

| | | |
|---|---|---|
| CN | 108021931 A | 5/2018 |
| CN | 110298415 A | 10/2019 |
| CN | 111222648 A | 6/2020 |
| CN | 112183577 A | 1/2021 |

OTHER PUBLICATIONS

Wang et al., "Double-Uncertainty Weighted Method for Semi-supervised Learning," Springer Nature Switzerland AG 2020 A. L. Martel et al. (Eds.): MICCAI 2020, LNCS 12261, pp. 542-551, 2020. https://doi.org/10.1007/978-3-030-59710-8_53 (Year: 2020).*

Antti Tarvainen et al., Mean teachers are better role models: Weight-averaged consistency targets improve semi-supervised deep learning results, arXiv:1703.01780v6 [cs.NE] Apr. 16, 2018, 16 pages.

Keze Wang et al., Cost-Effective Active Learning for Deep ImageClassification, arXiv:1701.03551v1 [cs.CV] Jan. 13, 2017, 10 pages.

Li Junnan et al.: "Dividemix: Learning With Noisy Labels as Semi-Supervised Learning", International Conference on Learning Representations, 2020, Dec. 12, 2020 (Dec. 12, 2020), pp. 1-14, XP093332918.

* cited by examiner

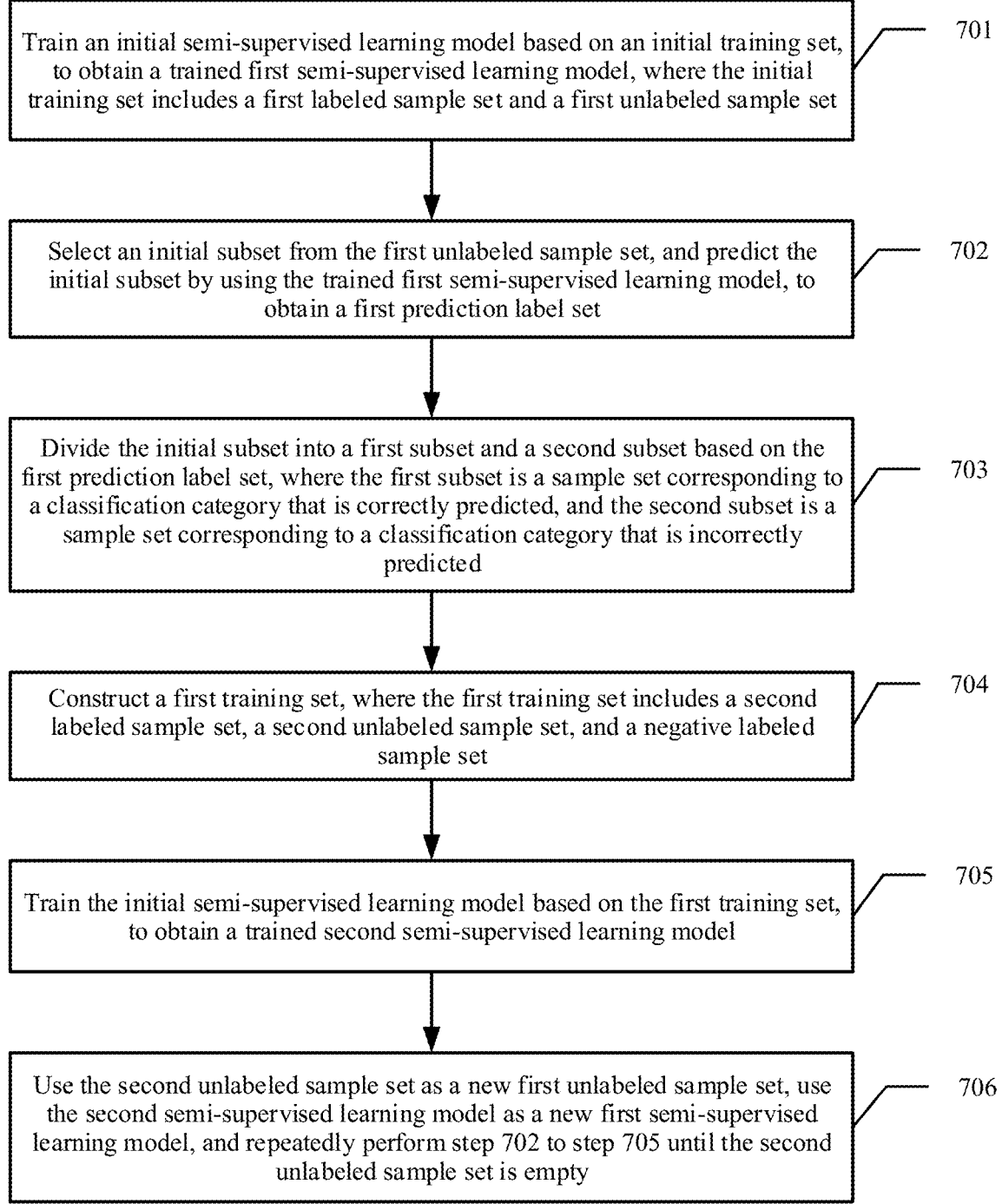

Train an initial semi-supervised learning model based on an initial training set, to obtain a trained first semi-supervised learning model, where the initial training set includes a first labeled sample set and a first unlabeled sample set — 701

Select an initial subset from the first unlabeled sample set, and predict the initial subset by using the trained first semi-supervised learning model, to obtain a first prediction label set — 702

Divide the initial subset into a first subset and a second subset based on the first prediction label set, where the first subset is a sample set corresponding to a classification category that is correctly predicted, and the second subset is a sample set corresponding to a classification category that is incorrectly predicted — 703

Construct a first training set, where the first training set includes a second labeled sample set, a second unlabeled sample set, and a negative labeled sample set — 704

Train the initial semi-supervised learning model based on the first training set, to obtain a trained second semi-supervised learning model — 705

Use the second unlabeled sample set as a new first unlabeled sample set, use the second semi-supervised learning model as a new first semi-supervised learning model, and repeatedly perform step 702 to step 705 until the second unlabeled sample set is empty — 706

FIG. 7

Obtain a target image     1001

Use the target image as an input of a trained semi-supervised learning model, and output a prediction result of the target image     1002

TRAINING METHOD FOR SEMI-SUPERVISED LEARNING MODEL, IMAGE PROCESSING METHOD, AND DEVICE

CROSS-REFERENCE TO RELATED APPLICATIONS

This application is a continuation of International Application No. PCT/CN2021/102726, filed on Jun. 28, 2021, which claims priority to Chinese Patent Application No. 202010899716.5, filed on Aug. 31, 2020. The disclosures of the aforementioned applications are hereby incorporated by reference in their entireties.

TECHNICAL FIELD

This application relates to the field of machine learning, and in particular, to a training method for a semi-supervised learning model, an image processing method, and a device.

BACKGROUND

Conventional machine learning tasks are classified into unsupervised learning (unlabeled data, for example, clustering and anomaly detection) and supervised learning (labeled data, for example, classification and regression). Semi-supervised learning (SSL) is a key problem in the field of mode recognition and machine learning, and is a learning method combining supervised learning and unsupervised learning. Semi-supervised learning uses a large amount of unlabeled data and some labeled data for mode recognition.

In an actual scenario, obtaining a label of data is usually very expensive. However, an existing semi-supervised learning model has a specific requirement on an amount of labeled data. When the amount of labeled data reaches a specific value, a generalization capability of the semi-supervised learning model can be significantly enhanced. In addition, prediction accuracy of the semi-supervised learning model further needs to be improved.

In view of this, it is urgent to develop a semi-supervised learning model with higher prediction accuracy that is obtained by training a small amount of labeled data.

SUMMARY

Embodiments of this application provide a training method for a semi-supervised learning model, an image processing method, and a device, to predict classification categories (namely, labels) of some unlabeled samples by using a trained first semi-supervised learning model in a current training phase. If prediction is correct, a correct label of the sample is obtained, or if prediction is incorrect, an incorrect label of the sample is excluded. Then, in a next training phase, a training set (namely, a first training set) is reconstructed based on the information, and an initial semi-supervised learning model is updated, to improve prediction accuracy of the model.

In view of this, embodiments of this application provide the following technical solutions.

According to a first aspect, an embodiment of this application first provides a training method for a semi-supervised learning model, and the method may be used in the field of artificial intelligence. The method may include: A training device first trains an initial semi-supervised learning model (which may also be referred to as an initial model) based on an obtained initial training set, to obtain a trained first semi-supervised learning model (which may be referred to as a trained first model). In the initial training set, some samples are labeled samples, and the other are unlabeled samples. The labeled samples are referred to as a first labeled sample set, and the unlabeled samples are referred to as a first unlabeled sample set. After obtaining the trained first model, the training device selects an initial subset from the first unlabeled sample set in the initial training set, where test data includes unlabeled samples in the initial subset, and is used to test the trained first model; and predicts the unlabeled samples in the selected initial subset by using the trained first model, to obtain a prediction label (the trained first model outputs probability prediction of a classification category of each selected unlabeled sample, and a classification category with a highest probability is usually used as a label of the sample that is predicted by the model) corresponding to each selected unlabeled sample, where a first prediction label set includes prediction labels. After obtaining the first prediction label set, the training device performs one-bit labeling on the initial subset based on the first prediction label set. The manner provides an amount of information (namely, "yes" or "no") with a $\log_2 2=1$ bit, and therefore is referred to as one-bit labeling. As described above, the one-bit labeling manner is specifically as follows: An annotator answers "yes" or "no" for a prediction label corresponding to each prediction sample. If the prediction label is a classification category that is correctly predicted, a positive label (which may also be referred to as a correct label) of the unlabeled sample is obtained. For example, if a prediction label is "dog", and a true label of the unlabeled sample is also "dog", prediction is correct, and the unlabeled sample obtains a positive label "dog". If the prediction label is a classification category that is incorrectly predicted, a negative label of the unlabeled sample is obtained, and an incorrect label of the unlabeled sample is excluded. For example, if a prediction label is "cat", but a true label of the unlabeled sample is "dog", prediction is incorrect, and the unlabeled sample obtains a negative label "not a cat". After one-bit labeling, the initial subset is divided into a first subset and a second subset. The first subset is a sample set corresponding to a classification category (namely, a positive label) that is correctly predicted, and the second subset is a sample set corresponding to a classification category (namely, a negative label) that is incorrectly predicted. After a one-bit labeling result is obtained, that is, a corresponding quantity of positive labels and negative labels are obtained, the training device reconstructs a training set, and the reconstructed training set may be referred to as a first training set. A specific construction manner may be using a positive labeled sample (namely, the first subset) and the existing labeled sample as labeled samples in a current phase, the labeled samples may also be referred to as a second labeled sample set; using negative labeled samples (namely, the second subset) as a negative labeled sample set in the current phase; and using remaining unlabeled samples in the first unlabeled sample set as a second unlabeled sample set in the current phase. The first training set includes the three types of samples. After the first training set is constructed, the initial model is retrained based on the first training set, to obtain a trained second semi-supervised learning model (which may be referred to as a trained second model) with a stronger capability.

In an embodiment, classification categories of some unlabeled samples are first predicted by using the trained first semi-supervised learning model, to obtain the prediction label, and whether each prediction label is correct is determined. If prediction is correct, the correct label (namely, a positive label) of the sample is obtained, or if prediction is incorrect, an incorrect label (namely, a negative label) of the sample is excluded. Then, in a next training phase, the training device reconstructs the training set (namely, the first training set) based on the information, and retrains the initial semi-supervised learning model based on the first training set, to improve prediction accuracy of the model. In addition, because an annotator only needs to answer "yes" or "no" for the prediction label, the labeling manner can relieve pressure of manual labeling that requires a large amount of correct labeled data in machine learning.

In an embodiment, a network structure of the initial semi-supervised learning model may specifically have a plurality of forms, for example, may include any one of the following models: a pi (Π)-model, a virtual adversarial training (VAT) model, a label propagation for deep semi-supervised learning (LPDSSL) model, a tangent-normal adversarial regularization (TNAR) model, a pseudo-labeling model, a deep convolutional neural network transfer (DCT) model, and a mean teacher model.

The implementation of this application describes semi-supervised learning models applicable to the training method provided in this embodiment of this application, and the models are universal and selectable.

In an embodiment, if the initial semi-supervised learning model is a learning model that has only one loss function, for example, any one of a Π-model, a VAT model, an LPDSSL model, a TNAR model, a pseudo-labeling model, and a DCT model, that the training device trains the initial model based on the first training set, to obtain a trained second model may specifically be as follows: For the second labeled sample set and the second unlabeled sample set, the training device trains the initial semi-supervised learning model based on the second labeled sample set, the second unlabeled sample set, and a first loss function. The first loss function is an original loss function loss1 of the initial semi-supervised learning model. For the negative labeled sample set, the training device trains the initial semi-supervised learning model based on the negative labeled sample set and a second loss function. The second loss function (which may be referred to as loss2) is a difference between a prediction value and a modification value that are output by the model, the modification value is a value for setting a dimension, corresponding to the prediction value, of the classification category that is incorrectly predicted to 0, and the second loss function loss2 is a new loss function constructed for the unlabeled sample set. Finally, the initial model is updated according to loss=loss1+σ×loss2. σ indicates a balance coefficient, and is an adjustable parameter obtained through training, and loss is an output value of a total loss function of the entire semi-supervised learning model. A training process is to make the total loss as small as possible.

In an embodiment, when there is one loss function of the initial semi-supervised learning model, a new loss function may be constructed for the negative labeled sample set. In other words, different loss functions are correspondingly used for different types of sample sets in the training set. Then, the initial semi-supervised learning model is trained based on the total loss function. This is more targeted.

In an embodiment, the training method in this embodiment of this application can be used to train the semi-supervised learning model with only one loss function, and can further be used to train a semi-supervised learning model with two or more loss functions. A process is similar. Specifically, the initial semi-supervised learning model may be a mean teacher model. A training policy of the mean teacher model is as follows: It is assumed that a training sample is a labeled sample (x1, y1) and an unlabeled sample x2, where y1 is a label of x1. The labeled sample (x1, y1) is input into a student model, to calculate an output value loss11 of a loss function 1. The unlabeled sample x2 is input into the student model, to obtain a prediction label label1 through calculation. Data processing (usually, disturbance processing to add noise) is performed on the unlabeled sample x2, and then the unlabeled sample is input into the teacher model, to obtain a prediction label label2 through calculation. If the mean teacher model is stable enough, the prediction label label1 may be the same as the prediction label label2, that is, the teacher model can resist disturbance of the unlabeled sample x2. In other words, a prediction label of the student model and a prediction label of the teacher model are expected to be as equal as possible. Therefore, an output value loss12 of a loss function 2 is obtained based on label1 and label2. Finally, the student model is updated according to loss=loss11+λ×loss12. λ indicates a balance coefficient, and is an adjustable parameter obtained through training, and loss is an output value of a total loss function of the entire mean teacher model. A training process is to make the total loss as small as possible. Therefore, that the training device trains the initial semi-supervised learning model based on the first training set, to obtain the trained second semi-supervised learning model may specifically be as follows: For the second labeled sample set, the training device trains the mean teacher model based on the second labeled sample set and a third loss function. The third loss function is the loss function 1 (namely, loss11). The training device further trains the mean teacher model based on the second labeled sample set, the second unlabeled sample set, and a fourth loss function. The fourth loss function is the loss function 2 (namely, loss12), and the third loss function loss11 and the fourth loss function loss12 are original loss functions of the mean teacher model. In addition, for the negative labeled sample, the training device further trains the mean teacher model based on the negative labeled sample set and a fifth loss function. The fifth loss function (which may be referred to as loss13) is a difference between a prediction value and a modification value that are output by the model, the modification value is a value for setting a dimension, corresponding to the prediction value, of the classification category that is incorrectly predicted to 0, and the fifth loss function loss13 is a new loss function constructed for the unlabeled sample set. Finally, the training device updates the initial mean teacher model according to loss=loss11+λ×loss12+γ×loss13. λ and γ indicate balance coefficients, and are adjustable parameters obtained through training, and loss is an output value of a total loss function of the entire mean teacher model. A training process is to make the total loss as small as possible.

In an embodiment, when the initial semi-supervised learning model is a mean teacher model, a new loss function may be constructed for the negative labeled sample set. In other words, different loss functions are correspondingly used for different types of sample sets in the training set. Then, the initial semi-supervised learning model is trained based on the total loss function. This is more targeted.

In an embodiment, the third loss function may be a cross entropy loss function; and/or the fourth loss function may be a mean squared error loss function.

In an embodiment, specific forms of the third loss function and the fourth loss function in the mean teacher model are feasible.

In an embodiment, the second unlabeled sample set is used as a new first unlabeled sample set, the second semi-supervised learning model is used as a new first semi-supervised learning model, and the operations are repeatedly performed until the second unlabeled sample set is empty.

In an embodiment, when more training samples with correct labels can be obtained, precision of the model can usually be improved. Therefore, the most direct method is to divide the training process into a plurality of phases. In each phase, some samples are selected from the first unlabeled sample set for prediction, a training set is reconstructed for the prediction label, and then the model is updated based on the reconstructed training set. Therefore, a generalization capability and prediction accuracy of the trained second semi-supervised learning model obtained in each phase are better than a generalization capability and prediction accuracy of a second semi-supervised learning model obtained in a previous phase.

In an embodiment, after the initial semi-supervised learning model is trained based on the first training set, to obtain the trained second semi-supervised learning model, the method further includes: deploying the trained second semi-supervised learning model on a target device, where the target device is configured to obtain a target image, and the trained second semi-supervised learning model is used to perform label prediction on the target image.

In an embodiment, a specific function of the trained second semi-supervised learning model is described. In other words, the trained second semi-supervised learning model is deployed on the target device to perform label prediction on the target image, that is, perform category prediction on the image. Compared with a semi-supervised learning model obtained through training by using the existing training method, the trained second semi-supervised learning model provided in this embodiment of this application improves accuracy of target image recognition.

In an embodiment, that the training device selects the initial subset from the first unlabeled sample set may specifically be as follows: randomly selecting a preset quantity of unlabeled samples from the first unlabeled sample set, to form the initial subset.

In an embodiment, unlabeled samples are selected from the first unlabeled sample set to form the initial subset, and a random selection manner ensures balance of selecting samples.

According to a second aspect, an embodiment of this application further provides an image processing method. The method specifically includes: An execution device first obtains a target image; and uses the target image as an input of a trained semi-supervised learning model, and outputs a prediction result of the target image. The trained semi-supervised learning model is the second semi-supervised learning model obtained in any one of the first aspect or the possible implementations of the first aspect.

In some embodiments, an application of the trained second semi-supervised learning model is described, that is, the trained second semi-supervised learning model is used to perform category prediction on an image. Compared with a semi-supervised learning model obtained through training by using the existing training method, the semi-supervised learning model provided in this embodiment of this application improves accuracy of target image recognition.

According to a third aspect, an embodiment of this application provides a training device, and the training device has a function of implementing the method in any one of the first aspect or the possible implementations of the first aspect. The function may be implemented by hardware, or may be implemented by hardware by executing corresponding software. The hardware or the software includes one or more modules corresponding to the function.

According to a fourth aspect, an embodiment of this application provides an execution device, and the execution device has a function of implementing the method in the second aspect. The function may be implemented by hardware, or may be implemented by hardware by executing corresponding software. The hardware or the software includes one or more modules corresponding to the function.

According to a fifth aspect, an embodiment of this application provides a training device. The training device may include a memory, a processor, and a bus system. The memory is configured to store a program. The processor is configured to invoke the program stored in the memory, to perform the method in any one of the first aspect or the possible implementations of the first aspect in embodiments of this application.

According to a sixth aspect, an embodiment of this application provides a training device. The training device may include a memory, a processor, and a bus system. The memory is configured to store a program. The processor is configured to invoke the program stored in the memory, to perform the method in the second aspect in embodiments of this application.

According to a seventh aspect, an embodiment of this application provides a computer-readable storage medium. The computer-readable storage medium stores instructions, and when the instructions are run on a computer, the computer is enabled to perform the method in any one of the first aspect or the possible implementations of the first aspect or the method in the second aspect.

According to an eighth aspect, an embodiment of this application provides a computer program or a computer program product. When the computer program or the computer program product is run on a computer, the computer is enabled to perform the method in any one of the first aspect or the possible implementations of the first aspect or the method in the second aspect.

DESCRIPTION OF DRAWINGS

FIG. 7 is a schematic flowchart of a training method for a semi-supervised learning model according to an embodiment of this application;

DESCRIPTION OF EMBODIMENTS

Figure 1:
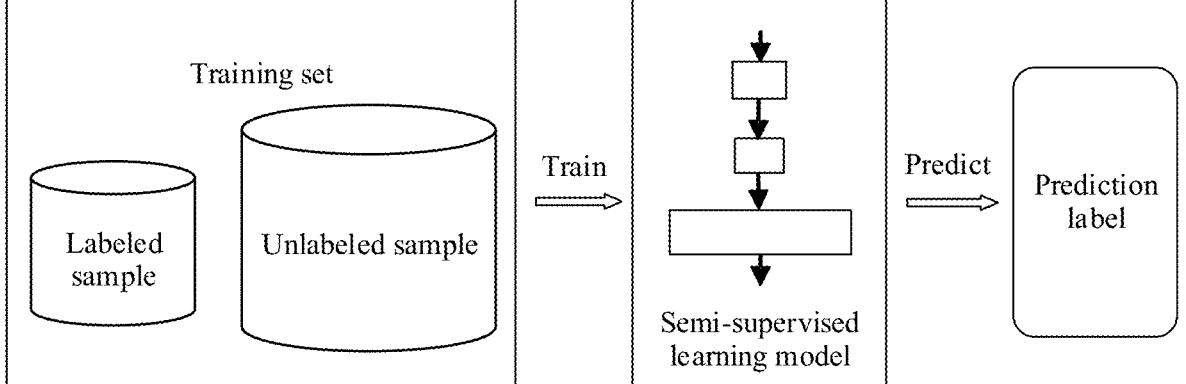
FIG. 1 is a schematic diagram of a process of training and inference of a semi-supervised learning model according to an embodiment of this application.

Embodiments of this application provide a training method for a semi-supervised learning model, an image processing method, and a device, to predict classification categories (namely, labels) of some unlabeled samples by using a trained first semi-supervised learning model in a current training phase. If prediction is correct, a correct label of the sample is obtained, or if prediction is incorrect, an incorrect label of the sample is excluded. Then, in a next training phase, a training set (namely, a first training set) is reconstructed based on the information, and an initial semi-supervised learning model is updated, to improve prediction accuracy of the model.

In the specification, claims, and the accompanying drawings of this application, terms "first", "second", and the like are intended to distinguish similar objects but do not necessarily indicate a specific order or sequence. It should be understood that the terms used in such a way are interchangeable in proper circumstances, which is merely a discrimination manner that is used when objects having a same attribute are described in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Because embodiments of this application relate to massive application of semi-supervised learning and a learning model, for ease of understanding the solutions in embodiments of this application, the following describes terms and concepts that may be used in embodiments of this application. It should be understood that explanations of related terms and concepts may be limited due to specific situations of embodiments of this application, but it does not mean that this application can only be limited to the specific situations. There may be differences in the specific situations of different embodiments. Details are not limited herein.

(1) Neural Network

The neural network may include a neuron, and may be understood as a neural network including an input layer, a hidden layer, and an output layer. Usually, a first layer is the input layer, a last layer is the output layer, and a middle layer is the hidden layer. A neural network including a plurality of hidden layers is referred to as a deep neural network (DNN). Work at each layer of the neural network may be described by using a mathematical expression $\vec{y} = a(W \cdot \vec{x} + b)$. From a physical layer, work at each layer of the neural network may be understood as completing transformation from input space to output space (namely, from row space to column space of a matrix) by performing five operations on the input space (a set of input vectors). The five operations are as follows: 1. dimension increasing/dimension reduction; 2. scaling up/scaling down; 3. rotation; 4. translation; and 5. "bending". The operation 1, the operation 2, and the operation 3 are performed by "$W \cdot \vec{x}$", the operation 4 is performed by "$+b$", and the operation 5 is performed by "a( )". The word "space" is used herein for expression because a classified object is not a single thing, but a type of things. Space is a collection of all individuals of such type of things. W is a weight matrix, and each value in the matrix indicates a weight value of one neuron in the neural network at this layer. The matrix W determines space transformation from the input space to the output space described above. In other words, W at each layer of the neural network controls how to transform space. A purpose of training the neural network is to finally obtain a weight matrix at all layers of a trained neural network. Therefore, the training process of the neural network is essentially a manner of learning control of space transformation, and more specifically, learning a weight matrix.

It should be noted that, in embodiments of this application, learning models (which are also referred to as learners or models) based on a machine learning (for example, active learning, supervised learning, unsupervised learning, and semi-supervised learning) task are essentially neural networks.

(2) Loss Function

During training of the neural network, because it is expected that an output of the neural network is as close as possible to a value that is actually expected to be predicted, a current prediction value of the network may be compared with a target value that is actually expected, and then a matrix vector at each layer of the neural network is updated based on a difference between the current prediction value and the target value (there is usually an initialization process before the first update, that is, a parameter is preconfigured for each layer of the neural network). For example, if the prediction value of the network is large, the matrix vector is adjusted to lower the prediction value until the neural network can predict the target value that is actually expected. Therefore, "how to obtain, through comparison, the difference between the prediction value and the target value" needs to be predefined. This is a loss function or an objective function. The loss function and the objective function are important equations used to measure the difference between the prediction value and the target value. The loss function is used as an example. A higher output value (loss) of the loss function indicates a larger difference. Therefore, training of the neural network is a process of minimizing the loss as much as possible.

During training of the neural network, an error back propagation (BP) algorithm may be used to correct a value of a parameter in an initial neural network model, so that a reconstruction error loss of the neural network model becomes smaller. Specifically, an input signal is transferred forward until an error loss occurs at an output, and the parameter in the initial neural network model is updated based on back propagation error loss information, to make the error loss converge. The back propagation algorithm is an error-loss-centered back propagation motion intended to obtain a parameter, such as a weight matrix, of an optimal neural network model.

(3) Feature

The feature is an input variable, namely, a variable x in simple linear regression. A simple machine learning task may use a single feature, and a complex machine learning task may use millions of features.

(4) Label

The label is a variable y in simple linear regression, and the label may be a future price of wheat, an/a animal/plant variety shown in an image, meaning of audio clipping, or anything. In embodiments of this application, the label is a classification category of an image. For example, there is an image of a cat, people know it is a cat, but a computing device does not know it is a cat. What is to be done? Then, a label is added to the image, and the label indicates to the computing device that information included in the image is "cat". Then, the computing device knows that it is a cat, learns all cats based on the label, and knows all cats based on the cat. Therefore, adding a label to data is to tell the computing device what is described by a plurality of features of an input variable (namely, y), where y may be referred to as a label or a target (namely, a target value).

(5) Sample

The sample is a specific instance of data. A sample x indicates an object, and is usually represented by a feature vector $x=(x_1, x_2, \ldots, x_d) \in R^d$, where d indicates a dimension (namely, a quantity of features) of the sample x. Samples are classified into a labeled sample and an unlabeled sample. The labeled sample includes both a feature and a label. The unlabeled sample includes a feature but does not include a label. A machine learning task usually learns a potential mode in an input d-dimensional training sample set (which may be referred to as a training set).

(6) Model

In embodiments of this application, learning models (which are also referred to as learners or models) based on a machine learning (for example, active learning, supervised learning, unsupervised learning, and semi-supervised learning) task are essentially neural networks. The model defines a relationship between a feature and a label. Application of the model usually includes two phases: training and inference. In the training phase, a model is trained based on a training set, to obtain a trained model. In the inference phase, the trained model is used to perform label prediction on an actual unlabeled instance. Prediction accuracy is one important indicator for measuring quality of model training.

(7) Semi-Supervised Learning (SSL)

Conventional machine learning tasks are classified into supervised learning and unsupervised learning based on whether a training sample has a label. Supervised learning is a learning task in which a training sample includes label information (that is, data has a label), for example, a common classification and regression algorithm. Unsupervised learning is a learning task in which a training sample does not include label information (that is, data has no label), for example, a clustering algorithm and an anomaly detection algorithm. In real life, a situation often combines the two tasks, that is, only some samples are labeled, and other samples are unlabeled. If only the labeled or unlabeled samples are used, some samples are wasted, and effect of the model obtained through training is not good due to a small quantity of samples. For example, when a web page is recommended, a user needs to mark a web page of interest, but few users are willing to spend time marking a web page. If an unlabeled sample set is directly discarded and the conventional supervised learning method is used, training samples are often insufficient. Consequently, a capability of describing overall distribution by the model is weakened, and generalization performance of the model is affected.

In view of this, semi-supervised learning emerges. Semi-supervised learning is a learning method combining supervised learning and unsupervised learning. Correspondingly, a used model may be referred to as a semi-supervised learning model. As shown in FIG. 1, FIG. 1 shows a process of training and inference of a semi-supervised learning model. A training set used by the model includes some labeled samples (a few samples) and some unlabeled samples (most samples). A basic idea of semi-supervised learning is to establish a model based on model assumption of data distribution, to label an unlabeled sample. Therefore, the model does not depend on external interaction, and automatically uses unlabeled samples to improve learning performance.

(8) Active Learning

When some conventional supervised learning methods are used for classification, a larger quantity of training samples indicates better classification effect. However, in many real life scenarios, it is difficult to obtain a labeled sample. Experts (for example, annotators) in the field are required to manually label correct labels, which is time- and cost-consuming. In addition, if a quantity of training samples is too large, training takes more time. Is there a way to get a better model with fewer labeled samples? Active learning may be used to get a better model with fewer labeled samples.

Figure 2:
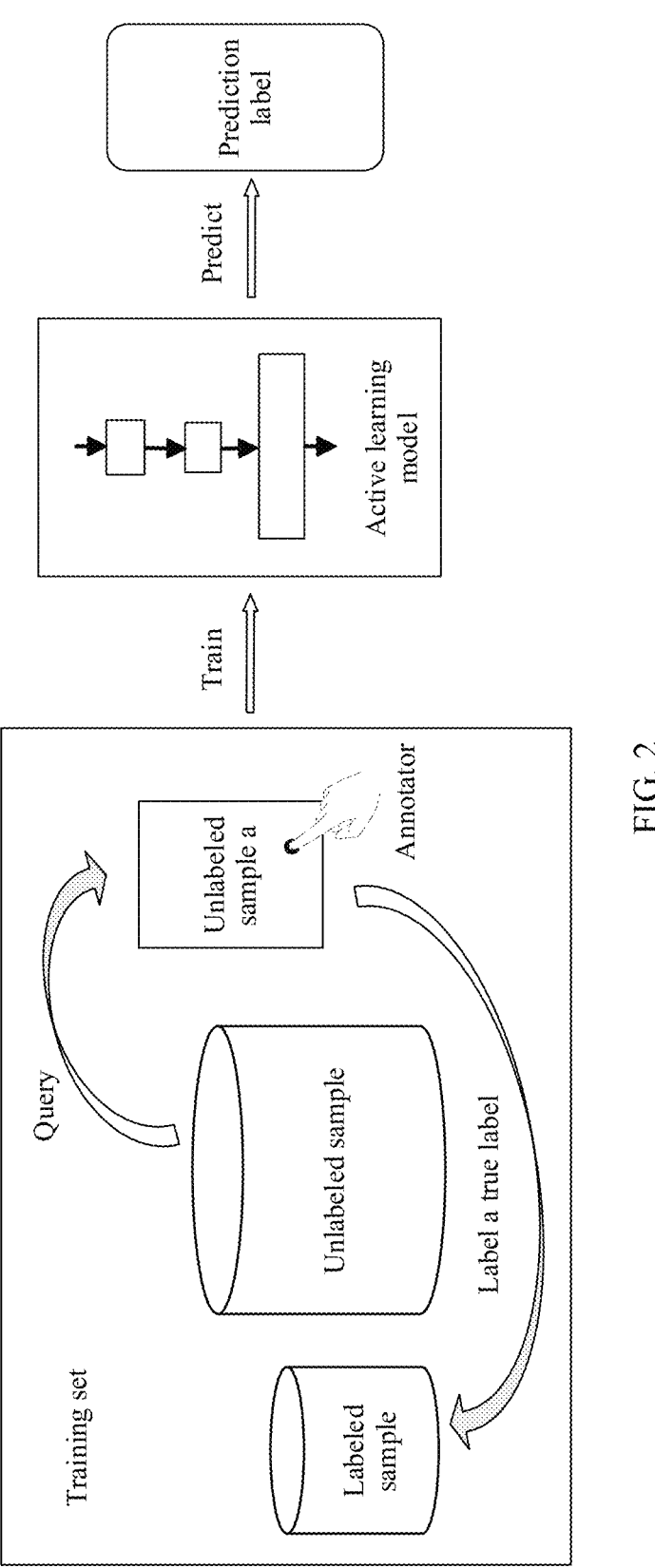
FIG. 2 is a schematic diagram of a process of training and inference of an active learning model according to an embodiment of this application.

A training set used by active learning is similar to a training set used by semi-supervised learning. As shown in FIG. 2, FIG. 2 shows a process of training and inference of an active learning model. The training set used by the model also includes some labeled samples (a few samples) and some unlabeled samples (most samples). However, a difference between the training set used by the active learning model and the training set used by the semi-supervised learning model lies in that a basic idea of active learning is to train the active learning model based on only the labeled samples in the training set, predict the unlabeled samples by using the active learning model, and select a sample (for example, an unlabeled sample found in FIG. 2) with high uncertainty or a low classification confidence, to consult the expert and perform labeling. For example, if the expert manually recognizes the selected unlabeled sample as "horse", the unlabeled sample is labeled as "horse". Then, a sample labeled with a true label is classified as a labeled sample in the training set, and the active learning model is retrained based on expanded labeled samples, to improve accuracy of the model. A problem of active learning is that experts are required to correctly label a sample (for example, label a true label).

(9) Mean Teacher Model

Figure 3:
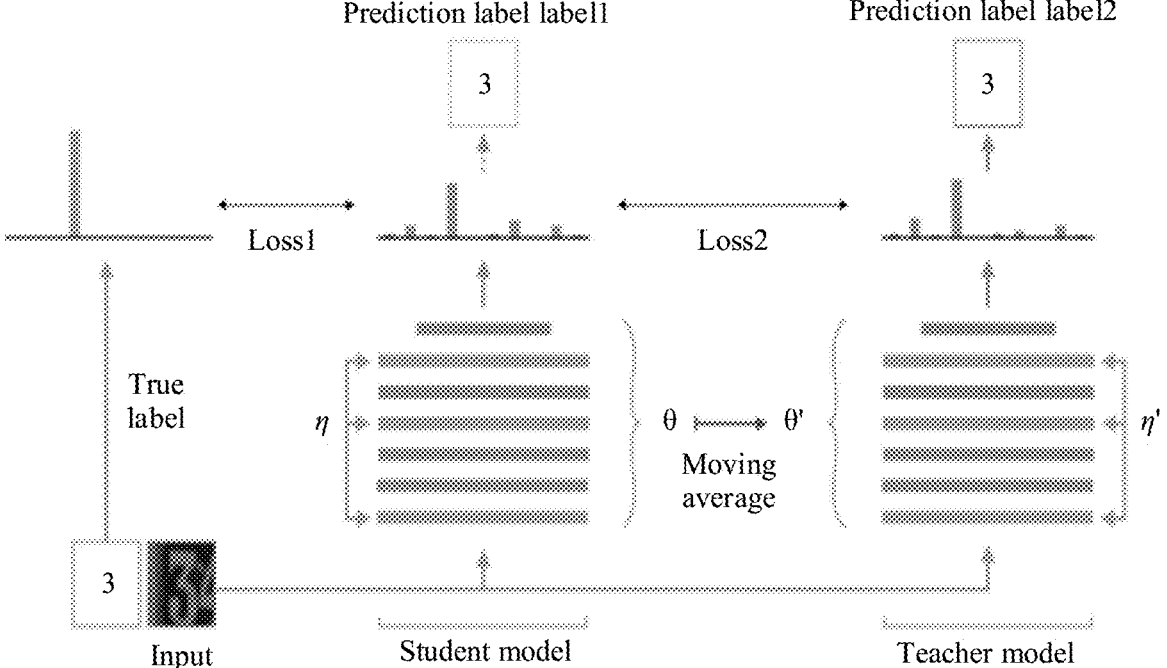
FIG. 3 is a schematic diagram of a mean teacher model.

The mean teacher model may also be referred to as a teacher-student model, and is a semi-supervised learning model. A related structure of the model is shown in FIG. 3. The model includes two submodels: a student model and a teacher model. In other words, the mean teacher model serves as both a student and a teacher. As a teacher, the teacher model is used to generate a goal during learning of the student model. As a student, the goal generated by the teacher model is used for learning. Network parameters of the teacher model are obtained through weighted average of network parameters of the student model in the history (first several operations). Network structures of the two submodels in the mean teacher model are the same. During training, the network parameters of the student model are updated by using a loss function gradient descent method. The network parameters of the teacher model are obtained through iteration of the network parameters of the student model.

Because the mean teacher model is a type of semi-supervised learning model, a training set used by the model also includes some labeled samples and some unlabeled samples. The following describes a training policy of the mean teacher model. It is assumed that a training sample is a labeled sample (x1, y1) and an unlabeled sample x2, where y1 is a label of x1. The labeled sample (x1, y1) is input into a student model, to calculate an output value loss11 of a loss function 1. The unlabeled sample x2 is input into the student model, to obtain a prediction label label 1 through calculation. Data processing (usually, disturbance processing to add noise) is performed on the unlabeled sample x2, and then the unlabeled sample is input into the teacher model, to obtain a prediction label label2 through calculation. If the mean teacher model is stable enough, the prediction label label1 may be the same as the prediction label label2, that is, the teacher model can resist disturbance of the unlabeled sample x2. In other words, a prediction label of the student model and a prediction label of the teacher model are expected to be as equal as possible. Therefore, an output value loss12 of a loss function 2 is obtained based on label1 and label2. Finally, the student model is updated according to loss=loss11+$\lambda$×loss12. $\lambda$ indicates a balance coefficient, and is an adjustable parameter obtained through training, and loss is an output value of a total loss function of the entire mean teacher model. A training process is to make the total loss as small as possible. In each operation, the network parameters of the student model are updated, and then the network parameters of the teacher model are updated based on the network parameters of the student model. A network parameter $\theta'$ of the teacher model in FIG. 3 is obtained by updating a network parameter $\theta$ of the student model, and a manner of updating is updating through exponential moving average (exponential moving average). In the teacher model in FIG. 3, $\eta'$ is a parameter for adding disturbance processing to an input.

The following describes embodiments of this application with reference to the accompanying drawings. A person of ordinary skill in the art may learn that as a technology evolves and a new scenario emerges, technical solutions provided in embodiments of this application are also applicable to a similar technical problem.

Figure 4:
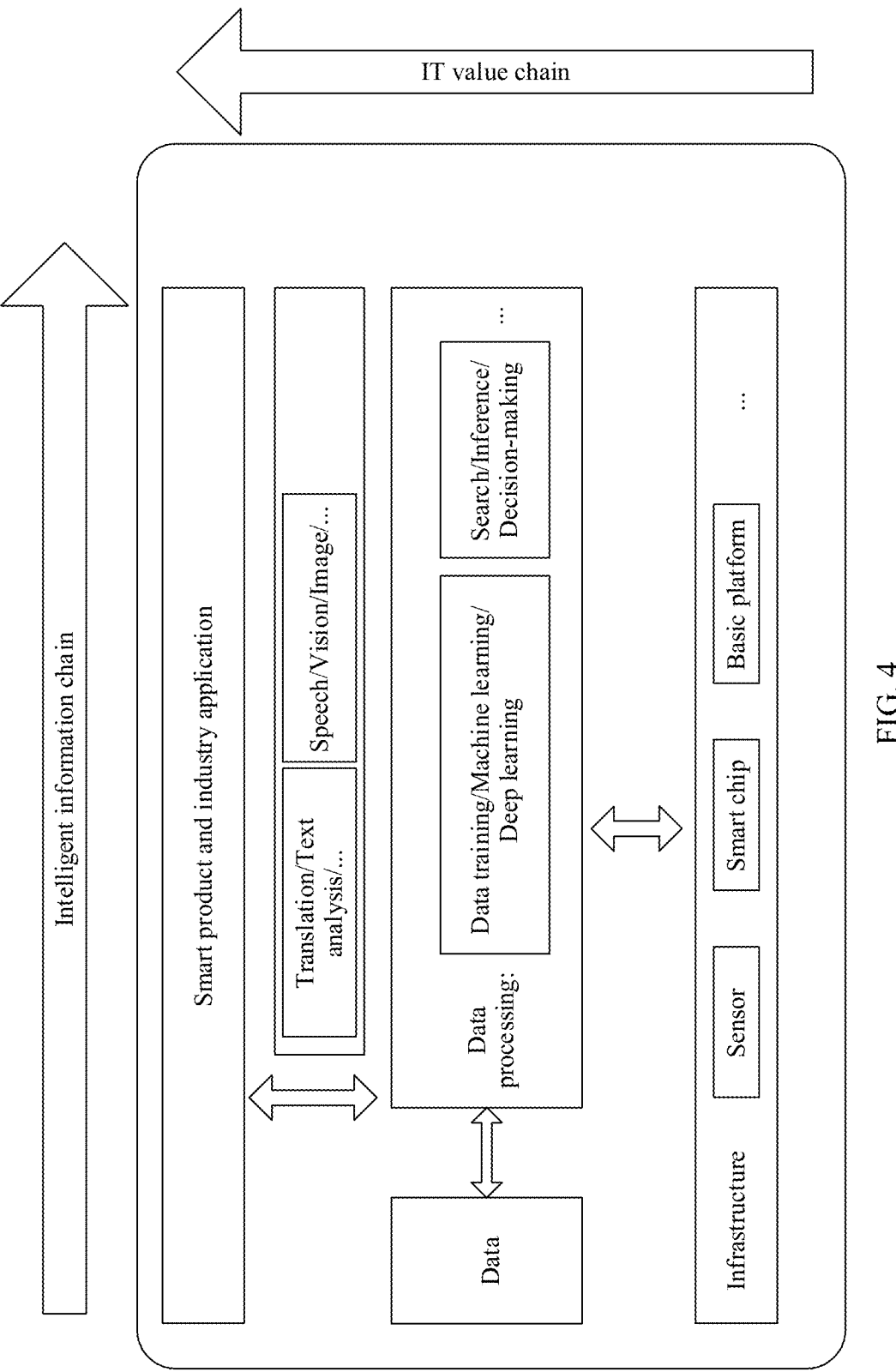
FIG. 4 is a schematic diagram of a structure of an artificial intelligence main framework according to an embodiment of this application.

An overall working procedure of an artificial intelligence system is first described. Refer to FIG. 4. FIG. 4 shows a schematic diagram of a structure of an artificial intelligence main framework. The following describes the artificial intelligence main framework from two dimensions: an "intelligent information chain" (horizontal axis) and an "IT value chain" (vertical axis). The "intelligent information chain" reflects a series of processes from obtaining data to processing the data. For example, the process may be a general process of intelligent information perception, intelligent information representation and formation, intelligent inference, intelligent decision-making, and intelligent execution and output. In this process, the data undergoes a refinement process of "data-information-knowledge-intelligence". The "IT value chain" reflects a value brought by artificial intelligence to the information technology industry from an underlying infrastructure and information (technology providing and processing implementation) of human intelligence to an industrial ecological process of a system.

(1) Infrastructure

The infrastructure provides computing capability support for the artificial intelligence system, implements communication with the external world, and implements support by using a basic platform. The infrastructure communicates with the outside by using a sensor. A computing capability is provided by a smart chip (a hardware acceleration chip such as a CPU, an NPU, a GPU, an ASIC, or an FPGA). The basic platform of the infrastructure includes related platforms, for example, a distributed computing framework and a network, for assurance and support, including cloud storage and computing, an interconnection network, and the like. For example, the sensor communicates with the outside to obtain data, and the data is provided to a smart chip in a distributed computing system provided by the basic platform for computing.

(2) Data

Data at an upper layer of the infrastructure indicates a data source in the field of artificial intelligence. The data relates to a graph, an image, speech, and text, further relates to Internet of things data of a conventional device, and includes service data of an existing system and perception data such as force, displacement, a liquid level, a temperature, and humidity.

(3) Data Processing

Data processing usually includes a manner such as data training, machine learning, deep learning, searching, inference, or decision-making.

Machine learning and deep learning may mean performing symbolic and formalized intelligent information modeling, extraction, preprocessing, training, and the like on data.

Inference is a process in which a human intelligent inference manner is simulated in a computer or an intelligent system, and machine thinking and problem resolving are performed by using formal information according to an inference control policy. A typical function is searching and matching.

Decision-making is a process in which a decision is made after intelligent information is inferred, and usually provides functions such as classification, ranking, and prediction.

(4) General Capability

After data processing mentioned above is performed on data, some general capabilities may further be formed based on a data processing result, for example, an algorithm or a general system, such as translation, text analysis, computer vision processing, speech recognition, and image recognition.

(5) Smart Product and Industry Application

The smart product and the industry application are a product and an application of the artificial intelligence system in various fields, and are package of an overall solution of the artificial intelligence, so that decision-making for intelligent information is productized and an application is implemented. Application fields mainly include a smart terminal, smart manufacturing, smart transportation, smart home, smart health care, autonomous driving, a smart city, and the like.

Embodiments of this application may be applied to optimization of training methods for various learning models in machine learning. A learning model obtained through training by using the training method in this application may specifically be applied to subdivision fields in the field of artificial intelligence, for example, the field of computer vision and the field of image processing. Specifically, with reference to FIG. 4, data in a data set obtained by the infrastructure in this embodiment of this application may be a plurality of different types of data (which is also referred to as training data or training samples, and a training set includes a plurality of pieces of training data) obtained by using sensors such as a camera and a radar, or may be a plurality of pieces of image data or a plurality of pieces of video data, provided that the training set meets a function of performing iterative training on the learning model. A type of data in the training set is not specifically limited herein. For ease of understanding, in the following embodiments of this application, an example in which the training set includes image data is used for description. It should be noted herein that the training set used in this embodiment of this application includes some labeled samples (a few samples) and some unlabeled samples (most samples). An annotator may manually label the labeled sample with true labels in advance.

Figure 5:
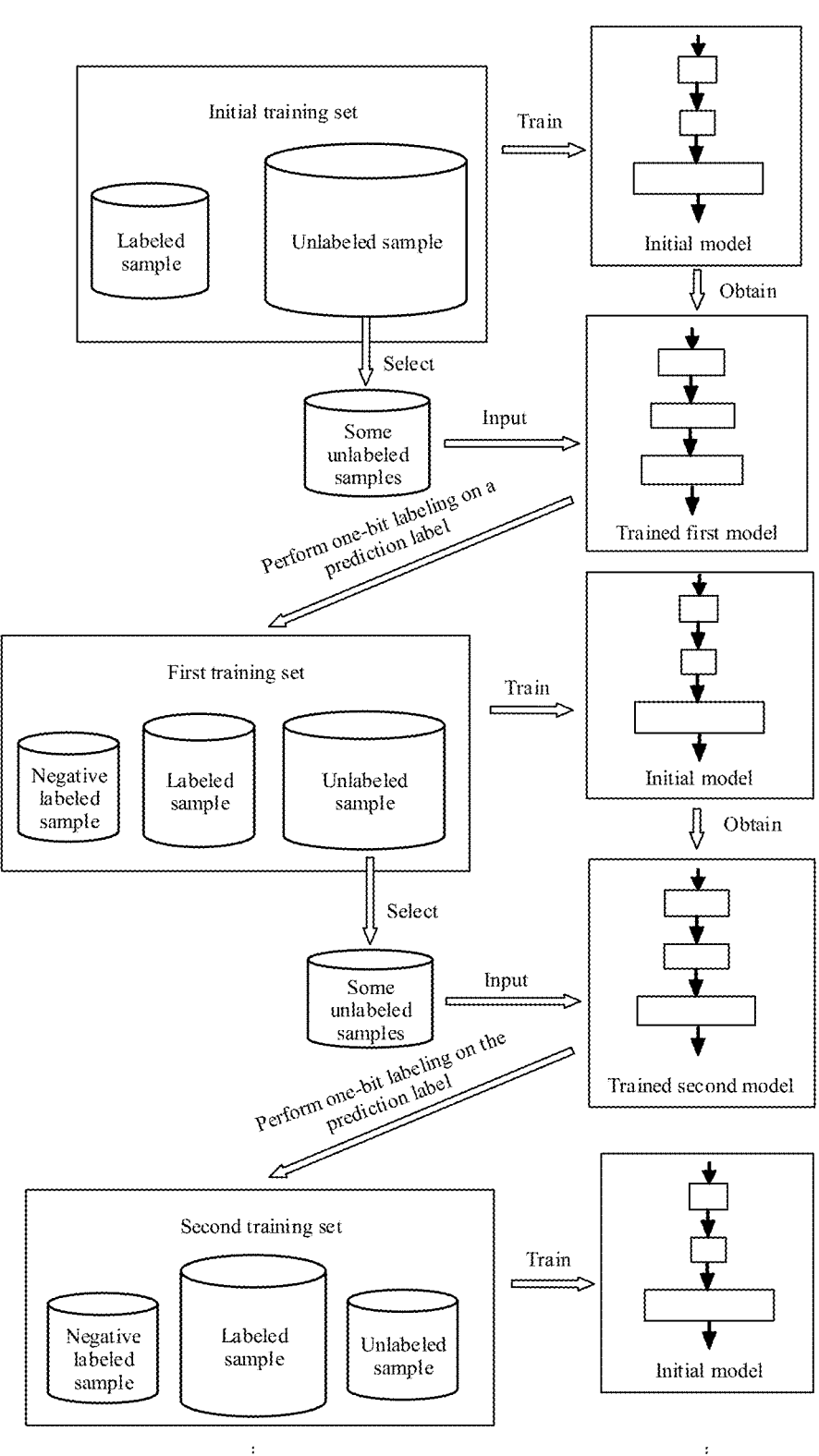
FIG. 5 is an overall flowchart of a training method for a semi-supervised learning model according to an embodiment of this application.

An overall process of a training method for a semi-supervised learning model in this embodiment of this application is shown in FIG. 5. First, an initial semi-supervised learning model (which may be referred to as an initial model) is trained based on a labeled sample and an unlabeled sample in an initial training set, to obtain a trained first semi-supervised learning model (which may be referred to as a trained first model). Then, some unlabeled samples are selected from all unlabeled samples in the initial training set as an input of the trained first model. The trained first model predicts the selected unlabeled samples, to obtain a prediction label of each selected unlabeled sample, and then performs one-bit labeling on each prediction label. The manner provides an amount of information (namely, "yes" or "no") with a $\log_2 2=1$ bit (bit), and therefore is referred to as one-bit labeling. The one-bit labeling manner is specifically as follows: An annotator answers "yes" or "no" for a prediction label corresponding to each prediction sample. If the prediction label is a classification category that is correctly predicted, a positive label (which may also be referred to as a correct label) of the unlabeled sample is obtained. For example, if a prediction label is "dog", and a true label of the unlabeled sample is also "dog", prediction is correct, and the unlabeled sample obtains a positive label "dog". If the prediction label is a classification category that is incorrectly predicted, a negative label of the unlabeled sample is obtained, and an incorrect label of the unlabeled sample is excluded. For example, if a prediction label is "cat", but a true label of the unlabeled sample is "dog", prediction is incorrect, and the unlabeled sample obtains a negative label "not a cat". After a one-bit labeling result is obtained in each phase, that is, a corresponding quantity of positive labels and negative labels are obtained, positive labeled samples are combined with existing labeled samples, to form labeled samples in a current phase. All three types of samples in the current phase include the negative labeled samples, negative labeled samples obtained in previous phases, and remaining unlabeled samples. A first training set includes the three types of samples. Then, the initial model is trained based on the first training set, to obtain a trained second semi-supervised learning model (which may be referred to as a trained second model) with a stronger capability. Finally, one-bit labeling is performed based on a prediction label of the trained second model, to obtain more positive labels. The process is repeatedly performed, to obtain a new model with an increasingly strong capability.

Figure 6:
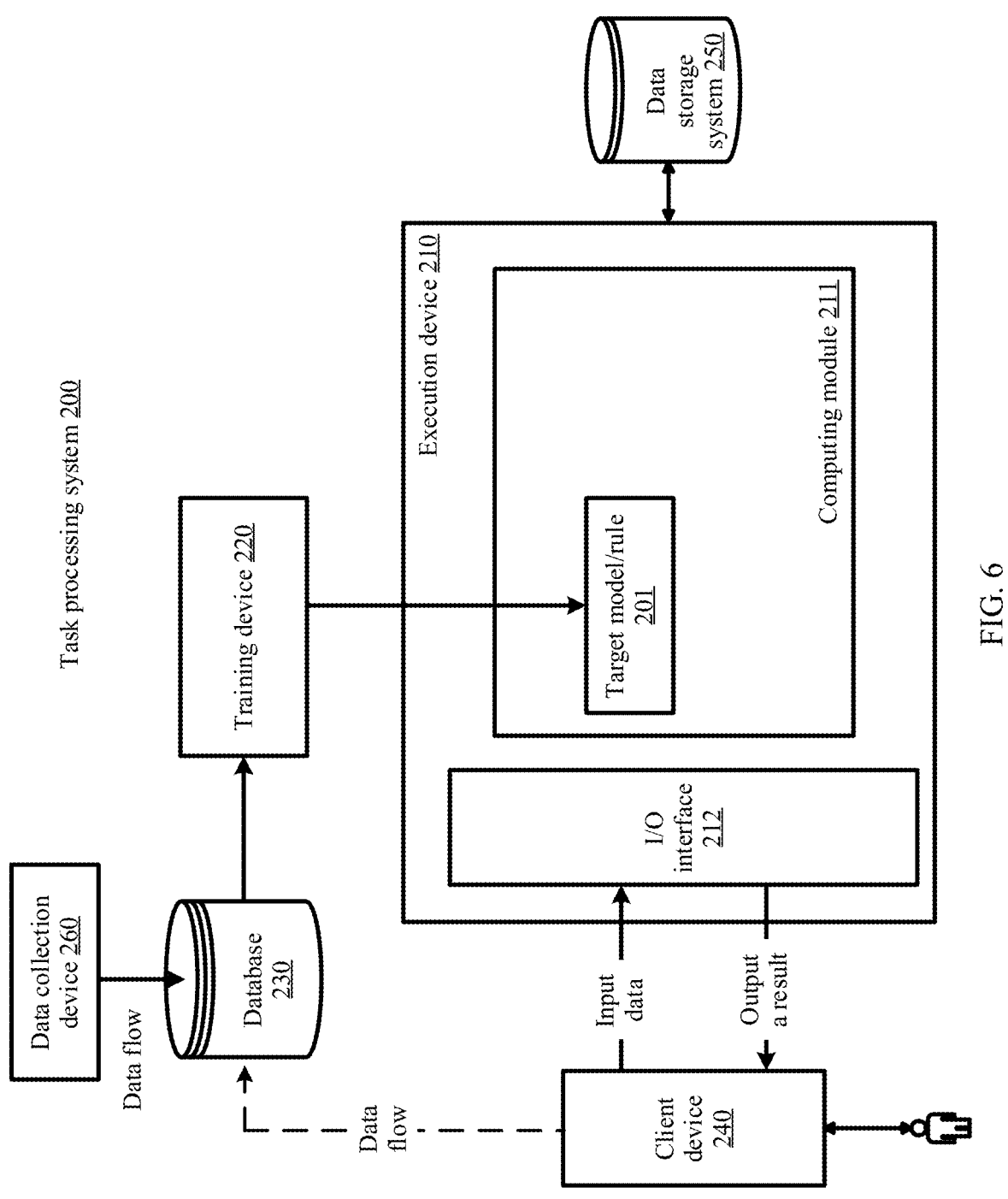
FIG. 6 is a schematic diagram of a system architecture of a task processing system according to an embodiment of this application.

It should be noted that the application procedure in FIG. 5 may be deployed on a training device. FIG. 6 is a diagram of a system architecture of a task processing system according to an embodiment of this application. In FIG. 6, a task processing system 200 includes an execution device 210, a training device 220, a database 230, a client device 240, a data storage system 250, and a data collection device 260. The execution device 210 includes a computing module 211. The data collection device 260 is configured to: obtain an open source large-scale data set (namely, the initial training set shown in FIG. 4) required by a user, and store, into the database 230, the initial training set and training sets, for example, a first training set and a second training set, in various phases that are subsequently constructed based on the initial training set. The training device 220 trains a target model/rule 201 (namely, an initial model in each phase) based on the maintained training set in each phase in the database 230, and a trained model (for example, the second model) is then applied on the execution device 210. The execution device 210 may invoke data, code, and the like in a data storage system 250, and may further store, in the data storage system 250, data, an instruction, and the like. The data storage system 250 may be disposed in the execution device 210, or the data storage system 250 may be an external memory relative to the execution device 210.

The second model trained by the training device 220 may be applied to different systems or devices (namely, the execution device 210), and may specifically be an edge device or a terminal-side device, for example, a mobile phone, a tablet, a notebook computer, or a camera. In FIG. 6, an I/O interface 212 is configured for an execution device 210, to exchange data with an external device. A "user" may input data to the I/O interface 212 by using a client device 240. For example, the client device 240 may be a camera device of a monitoring system. A target image photographed by the camera device is input to the computing module 211 of the execution device 210 as input data. The computing module 211 detects the input target image, to obtain a detection result (namely, a prediction label). Then, the detection result is output to the camera device, or is directly displayed on a display interface (if the execution device 210 has a display interface) of the execution device 210. In addition, in some implementations of this application, the client device 240 may alternatively be integrated into the execution device 210. For example, when the execution device 210 is a mobile phone, a target task may be directly obtained by using the mobile phone (for example, a target image may be photographed by a camera of the mobile phone, or target voice may be recorded by a recording module of the mobile phone, and the target task is not limited herein), or may be received from another device (for example, another mobile phone). Then, the computing module 211 in the mobile phone detects the target task, to obtain a detection result, and the detection result is directly presented on a display interface of the mobile phone. Product forms of the execution device 210 and the client device 240 are not limited herein.

It should be noted that FIG. 6 is merely a schematic diagram of a system architecture according to this embodiment of this application, and a location relationship between devices, components, modules, and the like shown in the figure does not constitute any limitation. For example, in FIG. 6, the data storage system 250 is an external memory relative to the execution device 210. In another case, the data storage system 250 may alternatively be disposed in the execution device 210. In FIG. 6, the client device 240 is a peripheral device relative to the execution device 210. In another case, the client device 240 may alternatively be integrated into the execution device 210.

It should further be noted that training of the initial model in this embodiment may be implemented on a cloud side. For example, a training device 220 (the training device 220 may be disposed on one or more servers or a virtual machine) on the cloud side may obtain the training set, and train the initial model based on the training sample in the training set, to obtain the trained second model. Then, the trained second model is sent to the execution device 210 for application, for example, label prediction. For example, as described in the system architecture corresponding to FIG. 6, the training device 220 trains the initial model, and the trained second model is sent to the execution device 210 for usage. Training of the initial model described in this embodiment may alternatively be implemented on a terminal side. In other words, the training device 220 may be located on the terminal side. For example, a terminal device (for example, a mobile phone or a smartwatch) or a wheel mobile device (for example, an autonomous driving vehicle or an assisted driving vehicle) may obtain the training set, and train the initial model based on the training sample in the training set, to obtain the trained second model. The trained second model may be directly used by the terminal device, or may be sent by the terminal device to another device for usage. Specifically, in this embodiment of this application, a device (a cloud side or a terminal side) on which the second model is trained or applied is not limited.

The following describes a training method for a semi-supervised learning model provided in embodiments of this application. FIG. 7 is a schematic flowchart of a training method for a semi-supervised learning model according to an embodiment of this application. Specifically, the method may include the following operations.

Operation 701: Train an initial semi-supervised learning model based on an initial training set, to obtain a trained first semi-supervised learning model, where the initial training set includes a first labeled sample set and a first unlabeled sample set.

A training device first trains the initial semi-supervised learning model (which may also be referred to as an initial model) based on the obtained initial training set, to obtain the trained first semi-supervised learning model (which may be referred to as a trained first model). In the initial training set, some samples are labeled samples, and the other are unlabeled samples. The labeled samples are referred to as a first labeled sample set, and the unlabeled samples are referred to as a first unlabeled sample set.

It should be noted herein that how to train, based on the initial training set, the initial semi-supervised learning model with a known network structure is known. Details are not described herein again.

Operation 702: Select an initial subset from the first unlabeled sample set, and predict the initial subset by using the trained first semi-supervised learning model, to obtain a first prediction label set.

After obtaining the trained first model, the training device selects the initial subset from the first unlabeled sample set in the initial training set, where test data includes unlabeled samples in the initial subset, and is used to test the trained first model; and predicts the unlabeled samples in the selected initial subset by using the trained first model, to obtain a prediction label (the trained first model outputs probability prediction of a classification category of each selected unlabeled sample, and a classification category with a highest probability is usually used as a label of the sample that is predicted by the model) corresponding to each selected unlabeled sample, where the first prediction label set includes prediction labels.

For ease of understanding, an example is used in the following. It is assumed that the initial training set includes 330 training samples, 30 are labeled samples, and 300 are unlabeled samples. In this case, the first labeled sample set includes the 30 labeled samples, and the first unlabeled sample set includes the 300 unlabeled samples. First, the initial model is trained based on the 330 training samples in the initial training set, to obtain the trained first model. Then, some unlabeled samples are selected from the 300 unlabeled samples, to form the initial subset. It is assumed that 100 unlabeled samples are selected. In this case, the 100 unlabeled samples are sequentially input into the trained first model for prediction, to obtain 100 corresponding prediction labels, and the first prediction label set includes the 100 prediction labels.

It should be noted that, in some implementations of this application, a manner in which the training device selects the initial subset from the first unlabeled sample set includes but is not limited to the following manner: randomly selecting a preset quantity of unlabeled samples from the first unlabeled sample set, to form the initial subset. For example, it is assumed that the first unlabeled sample set includes 300 unlabeled samples, and a preset quantity (for example, 100 or 150) of unlabeled samples may be randomly selected from the first unlabeled sample set, to form the initial subset.

Operation 703: Divide the initial subset into a first subset and a second subset based on the first prediction label set, where the first subset is a sample set corresponding to a classification category that is correctly predicted, and the second subset is a sample set corresponding to a classification category that is incorrectly predicted.

After obtaining the first prediction label set, the training device performs one-bit labeling on the initial subset based on the first prediction label set. The manner provides an amount of information (namely, "yes" or "no") with a $\log_2 2=1$ bit, and therefore is referred to as one-bit labeling. As described above, the one-bit labeling manner is specifically as follows: An annotator answers "yes" or "no" for a prediction label corresponding to each prediction sample. If the prediction label is a classification category that is correctly predicted, a positive label (which may also be referred to as a correct label) of the unlabeled sample is obtained. For example, if a prediction label is "dog", and a true label of the unlabeled sample is also "dog", prediction is correct, and the unlabeled sample obtains a positive label "dog". If the prediction label is a classification category that is incorrectly predicted, a negative label of the unlabeled sample is obtained, and an incorrect label of the unlabeled sample is excluded. For example, if a prediction label is "cat", but a true label of the unlabeled sample is "dog", prediction is incorrect, and the unlabeled sample obtains a negative label "not a cat". After one-bit labeling, the initial subset is divided into a first subset and a second subset. The first subset is a sample set corresponding to a classification category (namely, a positive label) that is correctly predicted, and the second subset is a sample set corresponding to a classification category (namely, a negative label) that is incorrectly predicted.

It should be noted that, in some implementations of this application, the annotator may be a manual annotator in the field, that is, whether the prediction labels are correct is determined by the manual annotator. In other words, after observing the sample, the annotator needs to answer whether the sample belongs to the predicted category. If prediction is correct, a correct label (namely, a positive label) of the sample is obtained. If prediction is incorrect, an incorrect label (namely, a negative label) of the sample is obtained. In some other implementations of this application, the annotator may be a computing device. The computing device has known a true label of each unlabeled sample, and compares a true label of an unlabeled sample with a prediction label of the same sample, to determine whether the sample belongs to the predicted category. If prediction is correct, a correct label (namely, a positive label) of the sample is obtained. If prediction is incorrect, an incorrect label (namely, a negative label) of the sample is obtained. A specific representation form of the annotator is not limited in this embodiment of this application.

Operation 704: Construct a first training set, where the first training set includes a second labeled sample set, a second unlabeled sample set, and a negative labeled sample set.

After a one-bit labeling result is obtained, that is, a corresponding quantity of positive labels and negative labels are obtained, the training device reconstructs a training set, and the reconstructed training set may be referred to as a first training set. A specific construction manner may be using a positive labeled sample (namely, the first subset) and the existing labeled sample as labeled samples in a current phase, the labeled samples may also be referred to as a second labeled sample set; using negative labeled samples (namely, the second subset) as a negative labeled sample set in the current phase; and using remaining unlabeled samples in the first unlabeled sample set as a second unlabeled sample set in the current phase. The first training set includes the three types of samples.

Operation 705: Train the initial semi-supervised learning model based on the first training set, to obtain a trained second semi-supervised learning model.

After the first training set is constructed, the training device retrains the initial model based on the first training set, to obtain the trained second semi-supervised learning model (which may be referred to as a trained second model) with a stronger capability.

It should be noted that, a difference between the initial training set and the first training set constructed in this application lies in that a negative labeled sample set is added. For the labeled sample set and the unlabeled sample set, training is still performed in an original manner. For the negative labeled sample set, a new loss function is constructed, and the negative labeled sample set is trained according to the newly constructed loss function. The newly constructed loss function is defined as a difference between a prediction value and a modification value that are output by the model, and the modification value is a value for setting a dimension, corresponding to the prediction value, of the classification category that is incorrectly predicted to 0.

To facilitate understanding of the corresponding loss function constructed for the negative labeled sample, an example is used for description. Usually, a model predicts an input sample (it is assumed that the sample is an image), and an output prediction value is an n-dimensional vector. The n dimensions indicate n classification categories, and a value in the n dimensions indicates a prediction probability of each corresponding classification category. Usually, a classification category with a highest prediction probability is selected as a label of the sample predicted by the model, and the prediction probability is usually a normalized prediction probability, that is, a sum of prediction probabilities of all classification categories is 1. It is assumed that there are six classification categories: "pig", "dog", "cat", "horse", "sheep", and "geese". After a sample is input into the model, the model outputs probability prediction of a classification category of the sample. It is assumed that prediction values output by the model are [0.05, 0.04, 0.01, 0.5, 0.32, 0.08]. In addition, classification categories of the prediction values in each dimension correspond to six classification categories: "pig", "dog", "cat", "horse", "sheep", and "geese". It can be learned from the output prediction values that the prediction probability corresponding to the classification category "horse" is the highest. Therefore, a label of the sample predicted by the model is "horse". It is assumed that the prediction label of the sample is a negative label after one-bit labeling, that is, the negative label of the sample is "not horse". Therefore, the value in the dimension corresponding to "horse" is modified from 0.5 to 0, that is, modification values are [0.05, 0.04, 0.01, 0, 0.32, 0.08]. Then, a difference between the prediction value and the modification value is defined as a loss function constructed for the negative labeled sample set.

It should be noted that in some implementations of this application, different semi-supervised learning models (which may be referred to as models) are used, and therefore, processes of training based on the first training set are also different. The following separately describes the processes.

(1) The Initial Semi-Supervised Learning Model has One Loss Function.

In some implementations of this application, that the training device trains the initial model based on the first training set, to obtain a trained second model may specifically be as follows: For the second labeled sample set and the second unlabeled sample set, the training device trains the initial semi-supervised learning model based on the second labeled sample set, the second unlabeled sample set, and a first loss function. The first loss function is an original loss function loss1 of the initial semi-supervised learning model. For the negative labeled sample set, the training device trains the initial semi-supervised learning model based on the negative labeled sample set and a second loss function. The second loss function (which may be referred to as loss2) is a difference between a prediction value and a modification value that are output by the model, the modification value is a value for setting a dimension, corresponding to the prediction value, of the classification category that is incorrectly predicted to 0, and the second loss function loss2 is a new loss function constructed for the unlabeled sample set. Details are not described herein again.

Finally, the initial model is updated according to loss=loss1+σ×loss2. σ indicates a balance coefficient, and is an adjustable parameter obtained through training, and loss is an output value of a total loss function of the entire semi-supervised learning model. A training process is to make the total loss as small as possible.

It should be noted that, in some implementations of this application, the initial semi-supervised learning model includes any one of the following models: a Π-model, a VAT model, an LPDSSL model, a TNAR model, a pseudo-labeling model, and a DCT model. The models have one known original loss function.

(2) The Initial Semi-Supervised Learning Model has a Plurality of Loss Functions.

In some implementations of this application, the training method in this embodiment of this application can be used to train the semi-supervised learning model with only one loss function, and can further be used to train a semi-supervised learning model with two or more loss functions. A process is similar. The following describes a case in which the initial semi-supervised learning model has a plurality of loss functions by using an example in which the semi-supervised learning model is a mean teacher model.

The following first describes a training policy of the mean teacher model. It is assumed that a training sample is a labeled sample (x1, y1) and an unlabeled sample x2, where y1 is a label of x1. The labeled sample (x1, y1) is input into a student model, to calculate an output value loss11 of a loss function 1. The unlabeled sample x2 is input into the student model, to obtain a prediction label label1 through calculation. Data processing (usually, disturbance processing to add noise) is performed on the unlabeled sample x2, and then the unlabeled sample is input into the teacher model, to obtain a prediction label label2 through calculation. If the mean teacher model is stable enough, the prediction label label1 may be the same as the prediction label label2, that is, the teacher model can resist disturbance of the unlabeled sample x2. In other words, a prediction label of the student model and a prediction label of the teacher model are expected to be as equal as possible. Therefore, an output value loss12 of a loss function 2 is obtained based on label1 and label2. Finally, the student model is updated according to loss=loss11+$\lambda$×loss12. $\lambda$ indicates a balance coefficient, and is an adjustable parameter obtained through training, and loss is an output value of a total loss function of the entire mean teacher model. A training process is to make the total loss as small as possible.

Based on the mean teacher model, for the second labeled sample set, the training device trains the mean teacher model based on the second labeled sample set and a third loss function. The third loss function is the loss function 1 (namely, loss11). The training device further trains the mean teacher model based on the second labeled sample set, the second unlabeled sample set, and a fourth loss function. The fourth loss function is the loss function 2 (namely, loss12), and the third loss function loss11 and the fourth loss function loss12 are original loss functions of the mean teacher model. In addition, for the negative labeled sample, the training device further trains the mean teacher model based on the negative labeled sample set and a fifth loss function. The fifth loss function (which may be referred to as loss13) is a difference between a prediction value and a modification value that are output by the model, the modification value is a value for setting a dimension, corresponding to the prediction value, of the classification category that is incorrectly predicted to 0, and the fifth loss function loss13 is a new loss function constructed for the unlabeled sample set. Details are not described herein again.

It should be noted that, in some implementations of this application, the third loss function loss11 may be a cross entropy loss function; and the fourth loss function loss12 may be a mean squared error loss function.

Finally, the initial mean teacher model is updated according to loss=loss11+$\lambda$×loss12+$\gamma$×loss13. $\lambda$ and $\gamma$ indicate balance coefficients, and are adjustable parameters obtained through training, and loss is an output value of a total loss function of the entire mean teacher model. A training process is to make the total loss as small as possible.

Operation 706: Use the second unlabeled sample set as a new first unlabeled sample set, use the second semi-supervised learning model as a new first semi-supervised learning model, and repeatedly perform operation 702 to operation 705 until the second unlabeled sample set is empty.

A process of operation 702 to operation 705 is a phase (which may be referred to as a phase 1) of obtaining the trained second model. Usually, when more training samples with correct labels can be obtained, precision of the model can be improved. A most direct method is to divide the training process into a plurality of phases. Therefore, in some implementations of this application, to obtain a second model with a stronger generalization capability, the second model is usually trained through a plurality of phases. In other words, one-bit labeling is performed again based on a prediction label of the trained second model, to obtain more positive labels. The process is repeated to obtain a new model with an increasingly strong capability. Specifically, the training device uses the second unlabeled sample set as a new first unlabeled sample set, use the second semi-supervised learning model as a new first semi-supervised learning model, and repeatedly perform operation 702 to operation 705 until the second unlabeled sample set is empty.

It should be noted that, in some implementations of this application, operation 706 may not be included. In other words, only one phase of training is performed, to obtain a second model trained through one training phase. In comparison with an existing training method, a generalization capability of the second model is also improved.

It should further be noted that, in some implementations of this application, it is assumed that the unlabeled samples forming the initial subset are all samples in the first unlabeled sample set. In this case, in the first training phase, the second unlabeled sample is empty, and operation 706 is not included.

It should further be noted that, after the trained second model is obtained, the second model may be deployed on the target device for application. In this embodiment of this application, the target device may specifically be a mobile device, for example, an edge device such as a camera or a smart home, or may be a terminal-side device, for example, a mobile phone, a personal computer, a computer workstation, a tablet computer, a smart wearable device (for example, a smartwatch, a smart band, or a smart headset), a game console, a set-top box, and a media consumer device. Specifically, a type of the target device is not limited herein.

It should further be noted that training of the semi-supervised learning model in this embodiment may be implemented on a cloud side. For example, based on the architecture of the task processing system shown in FIG. 6, the training device 220 (the training device 220 may be disposed on one or more servers or a virtual machine) on the cloud side may obtain the training set, and train the initial semi-supervised learning model based on the training sample in the training set, to obtain the trained semi-supervised learning model (for example, the trained first model or second model). Then, the trained second model is sent to the execution device 210 for application, for example, label prediction. For example, as described in the system architecture corresponding to FIG. 6, the training device 220 trains the model in each phase, and the trained second model is sent to the execution device 210 for usage. Training of the initial semi-supervised learning model described in this embodiment may alternatively be implemented on a terminal side. In other words, the training device 220 may be located on the terminal side. For example, a terminal device (for example, a mobile phone or a smartwatch) or a wheel mobile device (for example, an autonomous driving vehicle or an assisted driving vehicle) may obtain the training set, and train the initial model based on the training sample in the training set, to obtain the trained semi-supervised learning model (for example, the trained first model or second model). The trained second model may be directly used by the terminal device, or may be sent by the terminal device to another device for usage. Specifically, in this embodiment of this application, a device (a cloud side or a terminal side) on which the second model is trained or applied is not limited.

In some embodiments, the training device first predicts classification categories of some unlabeled samples by using the trained first semi-supervised learning model, to obtain the prediction label, and determines, in the one-bit labeling manner, whether each prediction label is correct. If prediction is correct, the correct label (namely, a positive label) of the sample is obtained, or if prediction is incorrect, an incorrect label (namely, a negative label) of the sample is excluded. Then, in a next training phase, the training device reconstructs the training set (namely, the first training set) based on the information, and retrains the initial semi-supervised learning model based on the first training set, to improve prediction accuracy of the model. In addition, in one-bit labeling, because an annotator only needs to answer "yes" or "no" for the prediction label, the labeling manner can relieve pressure of manual labeling that requires a large amount of correct labeled data in machine learning.

Figure 8:
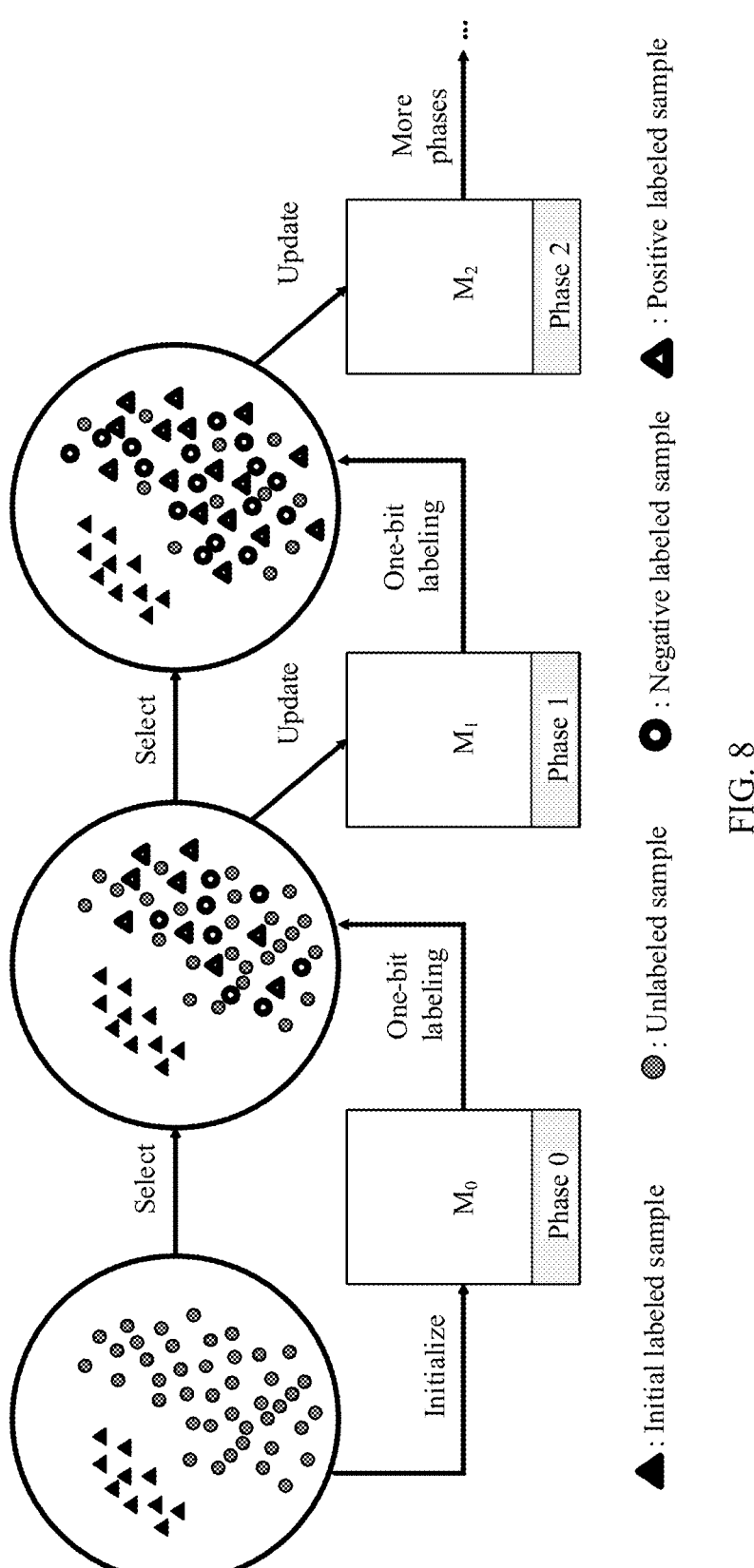
FIG. 8 is a schematic flowchart of a training method for a semi-supervised learning model according to an embodiment of this application.

For ease of understanding the training method according to FIG. 7 in this application, the following describes the entire training process by using an example. FIG. 8 is a schematic flowchart of a training method for a semi-supervised learning model according to an embodiment of this application. It is assumed that an initial training set includes 330 training samples, 30 are labeled samples (black solid triangles shown in FIG. 8), and 300 are unlabeled samples (gray dots shown in FIG. 8). In this case, a first labeled sample set includes the 30 labeled samples, and a first unlabeled sample set includes the 300 unlabeled samples. First, the initial model is trained based on the 330 training samples in the initial training set (namely, initialization corresponding to a phase 0 in FIG. 8), to obtain a trained first model. Then, some unlabeled samples are selected from the 300 unlabeled samples, to form an initial subset. It is assumed that 100 unlabeled samples are randomly selected, to form the initial subset. In this case, the 100 unlabeled samples are sequentially input to a trained first model for prediction, to obtain 100 corresponding prediction labels, and a first prediction label set includes the 100 prediction labels. Then, a training device classifies the 100 selected unlabeled samples into positive labeled samples (hollow triangles shown in FIG. 8) and negative labeled samples (hollow circles shown in FIG. 8) in a one-bit labeling manner. It is assumed that there are 40 positive labeled samples and 60 negative labeled samples. The 40 positive labeled samples and the original 30 labeled samples are combined, to form a second labeled sample set. After the selected 100 unlabeled samples are excluded from the original 300 unlabeled samples, 200 unlabeled samples are left. The remaining 200 unlabeled samples form a second unlabeled sample set, and 60 negative labeled samples obtained through one-bit labeling form a negative labeled sample set. Therefore, a first training set in a first phase includes the second labeled sample set, the second unlabeled sample set, and the negative labeled sample set. Operation 705 is performed based on the first training set, to obtain a trained second model (namely, a model $M_1$ in FIG. 8). The first phase (namely, a phase 1 in FIG. 8) is to obtain the second model that is trained for the first time. Then, the training device selects some unlabeled samples from the second unlabeled sample set, to form the initial subset in a second phase (namely, a phase 2 in FIG. 8). It is assumed that 100 (or another quantity, which is not limited herein) unlabeled samples are randomly selected, to form the initial subset in the second phase. In this case, the 100 unlabeled samples are sequentially input to the trained second model for prediction, to obtain 100 corresponding prediction labels. The first prediction label set (which may also be referred to as a second prediction label set) in the second phase includes the 100 prediction labels. Then, the training device classifies the 100 selected unlabeled samples into positive labeled samples and negative labeled samples in a one-bit labeling manner. It is assumed that there are 65 positive labeled samples and 35 negative labeled samples. The 65 positive labeled samples and the existing 70 labeled samples are combined, to form a second labeled sample set in the second phase. After the 100 unlabeled samples selected in the second phase are excluded from the remaining 200 unlabeled samples in the first phase, 100 unlabeled samples are left. The remaining 100 unlabeled samples form the second unlabeled sample set in the second phase, and 35 negative labeled samples obtained through one-bit labeling and the 60 negative labeled samples obtained in the first phase form the negative labeled sample set in the second phase. Therefore, the first training set (which may be referred to as a second training set) in the second phase includes the second labeled sample set, the second unlabeled sample set, and the negative labeled sample set in the second phase. Operation 705 is performed again based on the first training set in the second phase, to obtain the trained second model (which may be referred to as a third model, namely, a model $M_2$ in FIG. 8) in the second phase. The second phase (namely, a phase 2 in FIG. 8) is to obtain the second model that is trained for the second time. By analogy, the manner is performed until the second unlabeled sample set is empty.

Figures 9, 10:
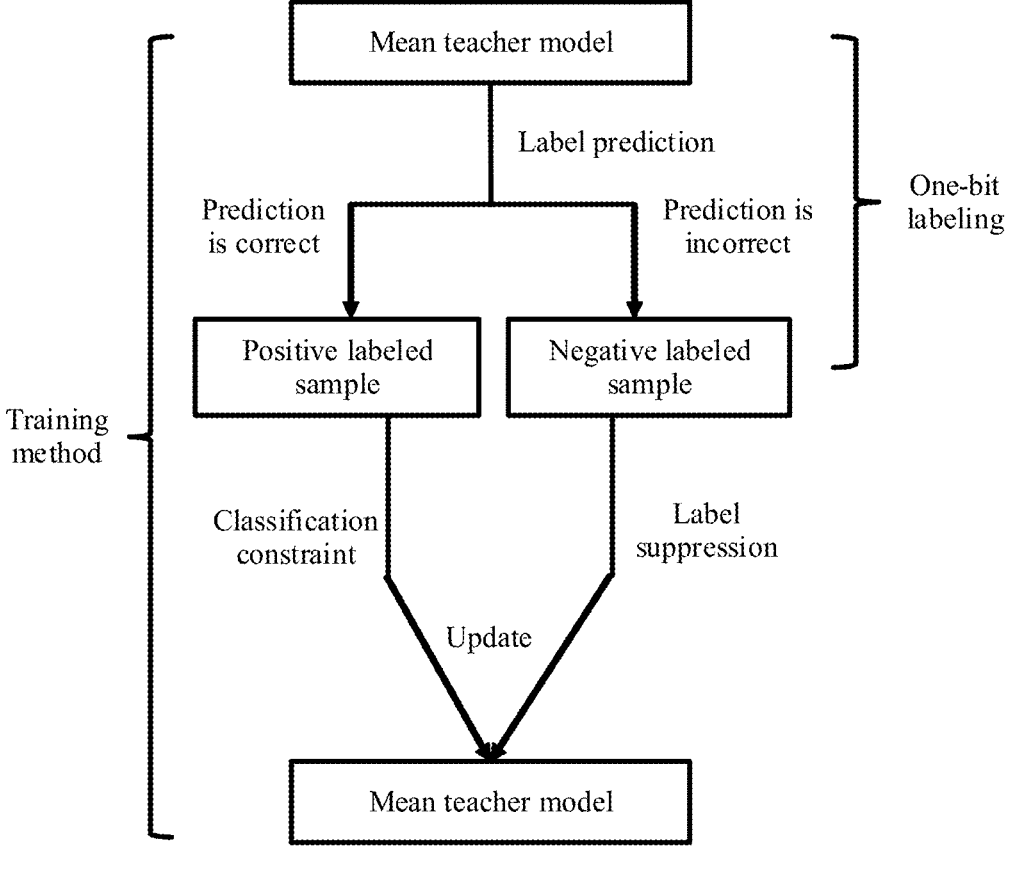
FIG. 9 is a schematic diagram of a training process of a mean teacher model according to an embodiment of this application.
FIG. 10 is a schematic flowchart of an image processing method according to an embodiment of this application.

In addition, to further understand more implementation details of the semi-supervised learning model, the following describes an entire training process (by using an example in which a training sample is an image) of the mean teacher model by using the mean teacher model as an example. Specifically, FIG. 9 is a schematic diagram of the training process of the mean teacher model. The conventional semi-supervised learning method uses a data set $\mathcal{D} = \{x_n\}_{n=1}^{N}$ as a training set, where N is a quantity of all training samples, and $x_n$ is an $n^{th}$ sample in image data. In addition, $y_n^*$ indicates a true label of the sample $x_n$, and $y_n^*$ is unknown to a training algorithm in setting. In particular, only a $y_n^*$ related to a set (namely, the first labeled sample set in this application) including L samples is provided. Usually, L is less than N. In other words, D is divided into two subsets: $\mathcal{D}^S$ and $\mathcal{D}^U$ that respectively indicate a labeled sample set and an unlabeled sample set. In the training method in this application, the training set is divided into three parts: $\mathcal{D} = \mathcal{D}^S \cup \mathcal{D}^O \cup \mathcal{D}^U$, where $\mathcal{D}^O$ is a sample set used for one-bit labeling, and a quantity of samples in $\mathcal{D}^O$ is not limited. For each sample in $\mathcal{D}^O$, an image and a prediction label of the image predicted by the model are provided for an annotator, and the annotator determines whether the image belongs to a classification category specified by a true label of the image. If prediction is correct, the image is assigned a positive label $(y_n^*)$. If prediction is incorrect, the image is assigned a negative label indicated by $y_n^-$. From the perspective of information theory, the annotator answers "yes" or "no", to provide one-bit supervised information for the system. For the labeling method that needs to obtain a correct label of a sample, the obtained supervised information is $\log_2 C$, and C is a total quantity of classification categories. For example, for a data set including 100 categories, 10K correct labels may be labeled, to provide $10K \times \log_2 100 = 66.4K$-bit information. Alternatively, 5K samples are correctly labeled, to provide 33.2K-bit information, and then the remaining 33.2K information is completed by answering "yes" or "no". Because the annotator only needs to answer "yes" or "no", the method provides one-bit information, and a loss of labeling one image is reduced. Therefore, more information of one bit-labeling can be obtained under a same loss.

Usually, when more training samples with correct labels can be obtained, precision of the model can be improved. Therefore, the most direct method is to divide the training process into a plurality of phases. In each phase, some samples in $\mathcal{D}^O$ are predicted, a training set is reconstructed for a prediction label, and then the model is updated based on the reconstructed training set, to strengthen the model. The initial model $\mathbb{M}_0$ is trained through a semi-supervised learning process when $\mathcal{D}^S$ is used as labeled data and $\mathcal{D}^O \cup \mathcal{D}^U$ is used as unlabeled data. In this embodiment of this application, a mean teacher model is used for description. It is assumed that subsequent training is divided into T phases (a termination condition of training is that all unlabeled samples are selected). In addition, $\mathcal{D}_{t-1}^R$ indicates a sample set (namely, a set including a negative labeled sample and an unlabeled sample) without a correct label in a phase t−1. $\mathcal{D}_0^R = \mathcal{D}_0^U$ Herein, $\mathcal{D}^{O+}$ and $\mathcal{D}^{O-}$ respectively indicate a correctly predicted sample set and an incorrectly predicted sample set, and are initialized to empty sets. In a $t^{th}$ phase, a fixed quantity of subsets $\mathcal{D}_t^O$ are randomly selected from the unlabeled sample set $\mathcal{D}_{t-1}^R$, and then a model $\mathbb{M}_{t-1}$ obtained in a previous phase predicts a label of the sample in $\mathcal{D}_t^O$. By checking a correct label, the sample that is correctly predicted is added to a positive labeled set $\mathcal{D}^{O+}$, and the sample that is incorrectly predicted is added to a negative labeled set $\mathcal{D}^{O-}$. Therefore, the entire training set is divided into three parts: a set $\mathcal{D}^S \cup \mathcal{D}^{O+}$ with a correct label, a set $\mathcal{D}^{O-}$ with a negative label, and a set $\mathcal{D}_t^U$ with an unlabeled sample. Finally, $\mathcal{D}_t^R = \mathcal{D}^{O-} \cup \mathcal{D}_t^U$, and $\mathbb{M}_{t-1}$ is updated as $\mathbb{M}_t$, to obtain a stronger model.

Then, in this embodiment of this application, a label suppression method is designed based on a mean teacher model, that is, designing a loss function corresponding to a negative labeled sample. The mean teacher model includes two parts: a teacher model and a student model. A training image is given. If the training image has a correct label, a corresponding cross entropy loss function is calculated. Regardless of whether the training image has a correct label, a distance between an output of the teacher model and an output of the student model is calculated as an additional loss function. The additional loss function is a mean squared error loss function. In addition, f(x;θ) is an expression function of the student model, and θ indicates a network parameter corresponding to the learning model. f(x;θ') indicates the teacher model, and θ' is a network parameter corresponding to the teacher model. A corresponding loss function (namely, a total loss) is defined as follows:

$$\mathcal{L}_{(\theta)} = \mathbb{E}_{x \in \mathcal{D}^S \cup \mathcal{D}^O} + CE(y_n{}^* - f(x;\theta)) + \lambda \cdot \mathbb{E}_{x \in \mathcal{D}} MSE(f(x;\theta') - f(x;\theta) + \gamma \cdot \mathbb{E}_{x \in \mathcal{D}} MSE(f(x;\theta') - f(x;\theta)))$$

and y both indicate balance coefficients, and are adjustable parameters obtained through training. In the formula, $\mathbb{E}$ indicates calculating an average value of output prediction values of all samples in a phase, CE indicates a cross entropy loss function, MSE indicates a mean squared error loss function, and $y_n{}^*$ indicates a positive label. For samples with correct labels, an output of the model is constrained by both a cross entropy term and a consistency term. For samples with negative labels, a new loss function is added in the method. The new loss function is based on modifying a second term in the loss function, namely, a value of a related location of an output f(x;θ') of the teacher model, to suppress a probability score of a category corresponding to the negative label to 0. For example, it is assumed that there are 100 classification categories, the prediction value output by the mean teacher model is a 100-dimensional vector, and each dimension indicates a prediction probability of a classification category corresponding to an output prediction value. It is assumed that a label of an image is a negative label "not dog", and a second dimension is a probability of "dog". The second dimension may be set to 0 for the corresponding image. A difference between the prediction value before modification and the prediction value after modification (namely, a modification value) is a third term in the loss function described in this application.

To have more intuitive understanding of advantageous effect brought by embodiments of this application, the following further compares technical effect brought by embodiments of this application. On the basis of a mean teacher model, in the training method for a semi-supervised learning model provided in embodiments of this application, experiments are performed on three popular image classification data sets: CIFAR-100, Mini-Imagenet, and Imagenet. For CIFAR-100, a 26-layer shake-shake regularized deep residual network is used in this application. For Mini-Imagenet and Imagenet, a 50-layer residual network is used in this application. In this application, a total of 180 epochs (namely, a process of training a training sample for one time) are trained on CIFAR-100 and Mini-Imagenet, and 60 epochs are trained on Imagenet. The mean squared error loss function is used as a consistency loss function on all the three data sets. A weight parameter of the consistency loss function is 1000 on CIFAR-100 and 100 on Mini-Imagenet and Imagenet. Each batch size of a sample is adjusted based on a hardware condition. For other parameter setting, refer to original setting of the mean teacher model. It can be learned from Table 1 that the experiments prove that in the case of supervised information of a same quantity of bits, performance of the training method provided in embodiments of this application is better than performance of another semi-supervised training method. Experimental results (namely, prediction accuracy) on three data sets demonstrate effectiveness of the method in embodiments of this application.

TABLE 1

| | Comparison of test results | | |
|---|---|---|---|
| Method | CIFAR100 | Mini-ImageNet | ImageNet |
| Π-Model | 56.57 (ConvNet-13) | — | — |
| DCT | 61.23 (ConvNet-13) | — | 53.50 (ResNet-18) |
| LPDSSL | 64.08 (ConvNet-13) | 42.65 (ResNet-18) | — |
| Mean Teacher | 69.76 (ResNet-26) | 41.06 (ResNet-50) | 58.16 (ResNet-50) |
| Ours (1-stage base) + | 51.47 → 66.26 | 22.36 → 35.88 | 47.83 → 54.46 |
| NLS | 51.47 → 71.13 | 22.36 → 38.30 | 47.83 → 58.52 |
| Ours (2-stage base) + | 51.47 → 64.83 → 69.39 | 22.36 → 33.97 → 39.68 | 47.83 → 54.04 → 55.64 |
| NLS | 51.47 → 67.82 → 73.76 | 22.36 → 37.92 → 45.54 | 47.83 → 57.44 → 60.40 |

An embodiment of this application further provides an image processing method. FIG. 10 is a schematic flowchart of an image processing method according to an embodiment of this application. Specifically, the method may include the following operations.

Operation 1001: Obtain a target image.

The trained second semi-supervised learning model may be deployed on an execution device. Specifically, the execution device first obtains the target image.

Operation 1002: Use the target image as an input of a trained semi-supervised learning model, and output a prediction result of the target image.

Then, the execution device uses the target image as an input of the trained semi-supervised learning model, and outputs the prediction result of the target image. The trained semi-supervised learning model is the second semi-supervised learning model in the foregoing embodiments.

In the implementation of this application, an application of the trained second semi-supervised learning model is described, that is, the trained second semi-supervised learning model is used to perform category prediction on an image. Compared with a semi-supervised learning model obtained through training by using the existing training method, the semi-supervised learning model provided in this embodiment of this application improves accuracy of target image recognition.

The trained semi-supervised learning model (namely, the trained second model) in this embodiment of this application may be used in fields such as a smart city and a smart terminal, to perform image classification processing. For example, the trained semi-supervised learning model in this application may be applied to various scenarios and problems in the field of computer vision, for example, some common tasks: facial recognition, image classification, and target detection. The trained semi-supervised learning model provided in embodiments of this application may be used in a plurality of scenarios. The following describes a plurality of application scenarios implemented in a product.

(1) Album Classification

A user stores a large quantity of images on a mobile phone and a cloud disk. User experience can be improved by performing classification management on an album based on a category. The images in the album are classified by using the trained semi-supervised learning model in embodiments of this application, to obtain albums arranged or stored by category. This can facilitate classification and management of different object categories by a user, facilitate searching of the user, save management time of the user, and improve efficiency of album management.

Figure 11:
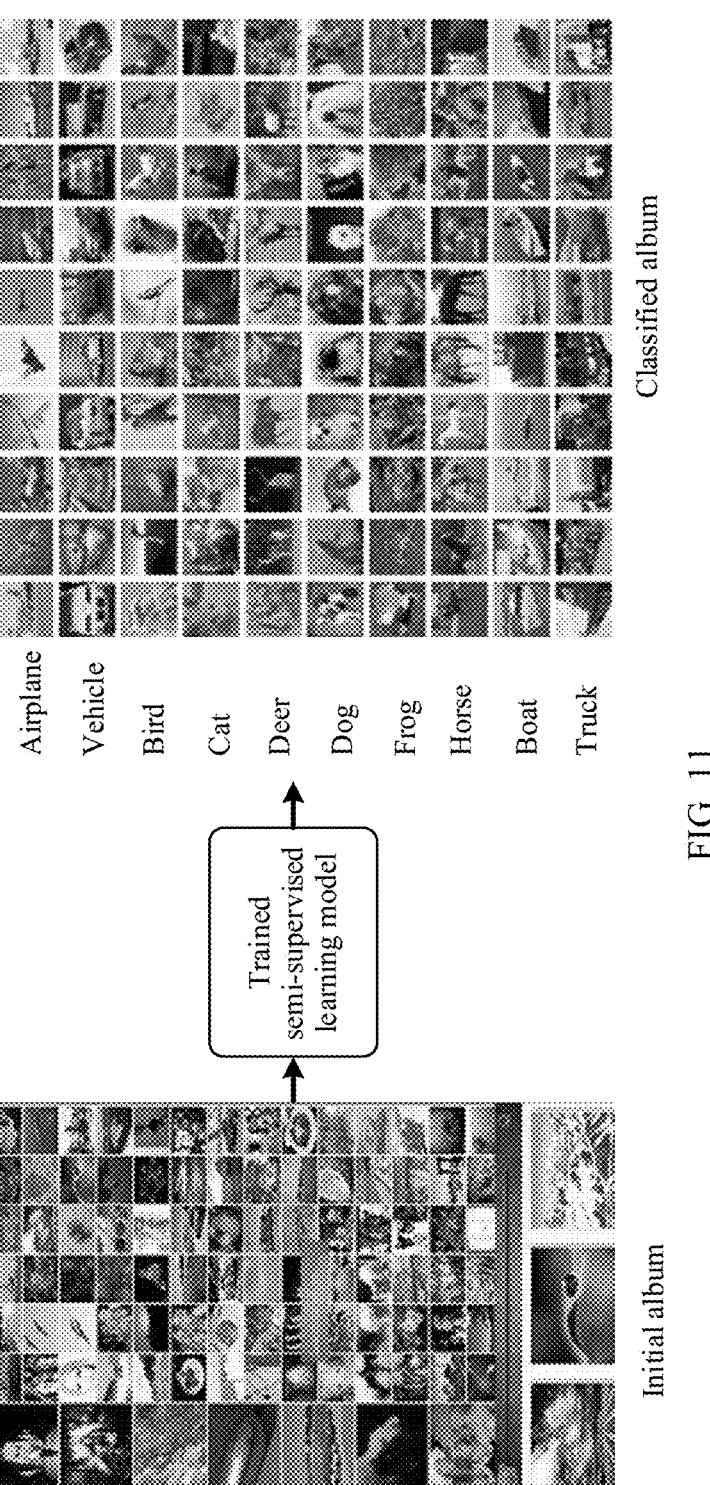
FIG. 11 is a schematic diagram of an application scenario according to an embodiment of this application.

Specifically, as shown in FIG. 11, when the trained semi-supervised learning model in embodiments of this application performs album classification, the image in the album is first input to the trained semi-supervised learning model for feature extraction. A prediction label (namely, a predicted classification category) of the image is obtained based on an extracted feature, and then the images in the album are classified based on classification categories of the images, to obtain an album arranged based on the classification categories. When the images in the album are arranged based on the classification categories, images belonging to a same category may be arranged in one row or one row. For example, in the finally obtained album, images in a first row are about an airplane, and images in a second row are about a vehicle.

(2) Object Recognition Through Photographing

Figure 12:
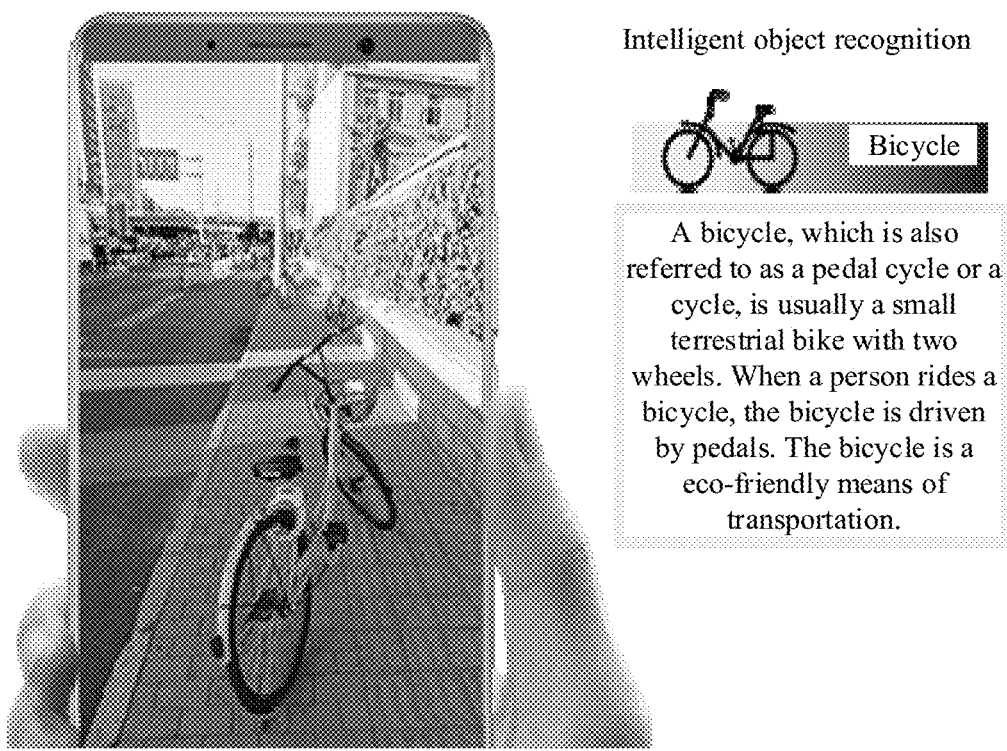
FIG. 12 is another schematic diagram of an application scenario according to an embodiment of this application.

During photographing, a user may process a taken photo by using the trained semi-supervised learning model in embodiments of this application, to automatically recognize a category of a photographed object. For example, the photographed object may be automatically recognized as a flower, an animal, or the like. For example, the trained semi-supervised learning model in embodiments of this application can identify a shared bicycle obtained through photographing, and it can be identified that the object belongs to a bicycle. Further, related information of the bicycle may be displayed. For details, refer to FIG. 12.

(3) Target Recognition

Figure 13:
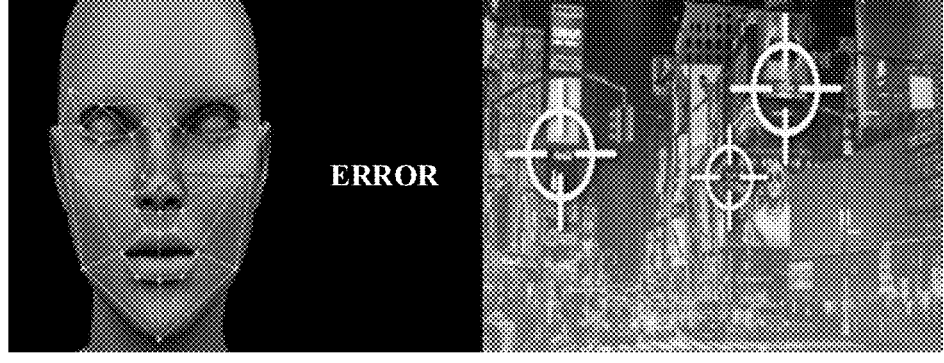
FIG. 13 is another schematic diagram of an application scenario according to an embodiment of this application.

For an obtained image, the trained semi-supervised learning model in embodiments of this application may further search for an image including a target object. For example, as shown in FIG. 13, the trained semi-supervised learning model in embodiments of this application may search a street scene obtained through photographing for a target object, for example, a face model on the left of FIG. 13.

(4) Object Recognition in Smart Driving

In an application scenario of autonomous driving, the trained semi-supervised learning model in embodiments of this application may process image data photographed by a sensor (for example, a camera) installed on a vehicle or an image in video data, to automatically recognize categories of various obstacles on a road during driving, for example, automatically recognize whether there is an obstacle in front of the vehicle on a road and a kind of the obstacle (for example, key obstacles such as an oncoming truck, a pedestrian, and a cyclist, or non-key obstacles such as bushes, a tree, and a building on the roadside).

It should be understood that album classification, object recognition through photographing, target recognition, object recognition in smart driving, and the like described above are only several specific scenarios to which the image classification method in this embodiment of this application is applied. Application of the trained semi-supervised learning model in embodiments of this application is not limited to the scenarios. The semi-supervised learning model can be applied to any scenario in which image classification or image recognition needs to be performed. The trained semi-supervised learning model provided in embodiments of this application can be applied to any field and device in which a semi-supervised learning model can be used. Examples are not described herein again.

Figure 14:
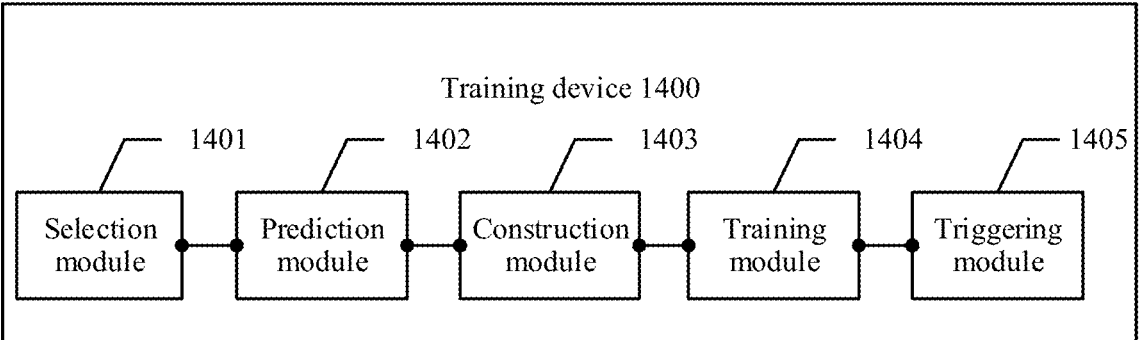
FIG. 14 is a schematic diagram of a training device according to an embodiment of this application.

Based on the corresponding embodiments, the following further provides a related device used to implement the solutions, to better implement the solutions in embodiments of this application. Specifically, FIG. 14 is a schematic diagram of a structure of a training device according to an embodiment of this application. A training device 1400 includes a selection module 1401, a prediction module 1402, a construction module 1403, and a training module 1404. The selection module 1401 is configured to select an initial subset from a first unlabeled sample set, and predict the initial subset by using a trained first semi-supervised learning model, to obtain a first prediction label set. The first semi-supervised learning model is obtained by training an initial semi-supervised learning model based on an initial training set, and the initial training set includes a first labeled sample set and the first unlabeled sample set. The prediction module 1402 is configured to divide the initial subset into a first subset and a second subset based on the first prediction label set. The first subset is a sample set corresponding to a classification category that is correctly predicted, and the second subset is a sample set corresponding to a classification category that is incorrectly predicted. The construction module 1403 is configured to construct a first training set. The first training set includes a second labeled sample set, a second unlabeled sample set, and a negative labeled sample set, the second labeled sample set is a sample set that includes the first labeled sample set and the first subset and that has a correct classification category, the second unlabeled sample set is an unlabeled sample set in the first unlabeled sample set other than the initial subset, and the negative labeled sample set is a sample set that includes the second subset and that has an incorrect classification category. The training module 1404 is configured to train the initial semi-supervised learning model based on the first training set, to obtain a trained second semi-supervised learning model.

In some embodiments, classification categories of some unlabeled samples are first predicted by using the trained first semi-supervised learning model, to obtain the prediction label, and the prediction module 1402 determines whether each prediction label is correct. If prediction is correct, the correct label (namely, a positive label) of the sample is obtained, or if prediction is incorrect, an incorrect label (namely, a negative label) of the sample is excluded. Then, in a next training phase, the construction module 1403 reconstructs the training set (namely, the first training set) based on the information, and the training module 1404 retrains the initial semi-supervised learning model based on the first training set, to improve prediction accuracy of the model. In addition, because the prediction module 1402 only needs to answer "yes" or "no" for the prediction label, the labeling manner can relieve pressure of manual labeling that requires a large amount of correct labeled data in machine learning.

In an embodiment, a network structure of the initial semi-supervised learning model may specifically have a plurality of forms, for example, may include any one of the following models: a Π-model, a VAT model, an LPDSSL model, a TNAR model, a pseudo-labeling model, a DCT model, and a mean teacher model.

The implementation of this application describes semi-supervised learning models applicable to the training method provided in this embodiment of this application, and the models are universal and selectable.

In an embodiment, if the initial semi-supervised learning model is a learning model that has only one loss function, for example, any one of a Π-model, a VAT model, an LPDSSL model, a TNAR model, a pseudo-labeling model, and a DCT model, the training module 1404 is specifically configured to: for the second labeled sample set and the second unlabeled sample set, train the initial semi-supervised learning model based on the second labeled sample set, the second unlabeled sample set, and a first loss function, where the first loss function is an original loss function $loss1$ of the initial semi-supervised learning model; and for the negative labeled sample set, train the initial semi-supervised learning model based on the negative labeled sample set and a second loss function. The second loss function (which may be referred to as $loss2$) is a difference between a prediction value and a modification value that are output by the model, the modification value is a value for setting a dimension, corresponding to the prediction value, of the classification category that is incorrectly predicted to 0, and the second loss function $loss2$ is a new loss function constructed for the unlabeled sample set. Finally, the initial model is updated according to $loss = loss1 + \sigma \times loss2$. $\sigma$ indicates a balance coefficient, and is an adjustable parameter obtained through training, and loss is an output value of a total loss function of the entire semi-supervised learning model. A training process is to make the total loss as small as possible.

In this implementation, when there is one loss function of the initial semi-supervised learning model, a new loss function may be constructed for the negative labeled sample set. In other words, different loss functions are correspondingly used for different types of sample sets in the training set. Then, the initial semi-supervised learning model is trained based on the total loss function. This is more targeted.

In an embodiment, the training method in this embodiment of this application can be used to train the semi-supervised learning model with only one loss function, and can further be used to train a semi-supervised learning model with two or more loss functions. A process is similar. Specifically, the initial semi-supervised learning model may be a mean teacher model. A training policy of the mean teacher model is as follows: It is assumed that a training sample is a labeled sample $(x1, y1)$ and an unlabeled sample $x2$, where $y1$ is a label of $x1$. The labeled sample $(x1, y1)$ is input into a student model, to calculate an output value $loss11$ of a loss function 1. The unlabeled sample $x2$ is input into the student model, to obtain a prediction label $label1$ through calculation. Data processing (usually, disturbance processing to add noise) is performed on the unlabeled sample $x2$, and then the unlabeled sample is input into the teacher model, to obtain a prediction label $label2$ through calculation. If the mean teacher model is stable enough, the prediction label $label1$ may be the same as the prediction label $label2$, that is, the teacher model can resist disturbance of the unlabeled sample $x2$. In other words, a prediction label of the student model and a prediction label of the teacher model are expected to be as equal as possible. Therefore, an output value $loss12$ of a loss function 2 is obtained based on $label1$ and $label2$. Finally, the student model is updated according to $loss = loss11 + \lambda \times loss12$. $\lambda$ indicates a balance coefficient, and is an adjustable parameter obtained through training, and loss is an output value of a total loss function of the entire mean teacher model. A training process is to make the total loss as small as possible. Therefore, the training module 1404 is specifically configured to: for the second labeled sample set, train the mean teacher model based on the second labeled sample set and a third loss function, where the third loss function is the loss function 1 (namely, $loss11$); train the mean teacher model based on the second labeled sample set, the second unlabeled sample set, and a fourth loss function, where the fourth loss function is the loss function 2 (namely, $loss12$), and the third loss function $loss11$ and the fourth loss function $loss12$ are original loss functions of the mean teacher model; and for the negative labeled sample, further train the mean teacher model based on the negative labeled sample set and a fifth loss function. The fifth loss function (which may be referred to as $loss13$) is a difference between a prediction value and a modification value that are output by the model, the modification value is a value for setting a dimension, corresponding to the prediction value, of the classification category that is incorrectly predicted to 0, and the fifth loss function $loss13$ is a new loss function constructed for the unlabeled sample set. Finally, the initial mean teacher model is updated according to $loss = loss11 + \lambda \times loss12 + \gamma \times loss13$. $\lambda$ and $\gamma$ indicate balance coefficients, and are adjustable parameters obtained through training, and loss is an output value of a total loss function of the entire mean teacher model. A training process is to make the total loss as small as possible.

In an embodiment, when the initial semi-supervised learning model is a mean teacher model, a new loss function may be constructed for the negative labeled sample set. In other words, different loss functions are correspondingly used for different types of sample sets in the training set. Then, the initial semi-supervised learning model is trained based on the total loss function. This is more targeted.

In an embodiment, the third loss function may be a cross entropy loss function; and/or the fourth loss function may be a mean squared error loss function.

In some embodiments, specific forms of the third loss function and the fourth loss function in the mean teacher model are feasible.

In an embodiment, the training device 1400 may further include a triggering module 1405. The triggering module 1405 is configured to: use the second unlabeled sample set as a new first unlabeled sample set, use the second semi-supervised learning model as a new first semi-supervised learning model, and trigger the selection module 1401, the prediction module 1402, the construction module 1403, and the training module 1404 to repeatedly perform the corresponding operations until the second unlabeled sample set is empty.

In this implementation, when more training samples with correct labels can be obtained, precision of the model can usually be improved. Therefore, the most direct method is to divide the training process into a plurality of phases. In each phase, some samples are selected from the first unlabeled sample set for prediction, a training set is reconstructed for the prediction label, and then the model is updated based on the reconstructed training set. Therefore, a generalization capability and prediction accuracy of the trained second semi-supervised learning model obtained in each phase are better than a generalization capability and prediction accuracy of a second semi-supervised learning model obtained in a previous phase.

In an embodiment, after the initial semi-supervised learning model is trained based on the first training set, to obtain the trained second semi-supervised learning model, the triggering module 1405 may further be configured to deploy the trained second semi-supervised learning model on a target device, where the target device is configured to obtain a target image, and the trained second semi-supervised learning model is used to perform label prediction on the target image.

In this embodiment, a specific function of the trained second semi-supervised learning model is described. In other words, the trained second semi-supervised learning model is deployed on the target device to perform label prediction on the target image, that is, perform category prediction on the image. Compared with a semi-supervised learning model obtained through training by using the existing training method, the trained second semi-supervised learning model provided in this embodiment of this application improves accuracy of target image recognition.

In an embodiment, the selection module 1401 is specifically configured to randomly select a preset quantity of unlabeled samples from the first unlabeled sample set, to form the initial sub set.

The implementation of this application is an implementation of selecting unlabeled samples from the first unlabeled sample set to form the initial subset, and a random selection manner ensures balance of selecting samples.

It should be noted that content such as information exchange or an execution process between the modules/units in the training device 1400 in the embodiment corresponding to FIG. 14 is based on a same concept as the embodiments corresponding to FIG. 5 to FIG. 9 in this application. For specific content, refer to descriptions in embodiments in this application. Details are not described herein again.

Figure 15:
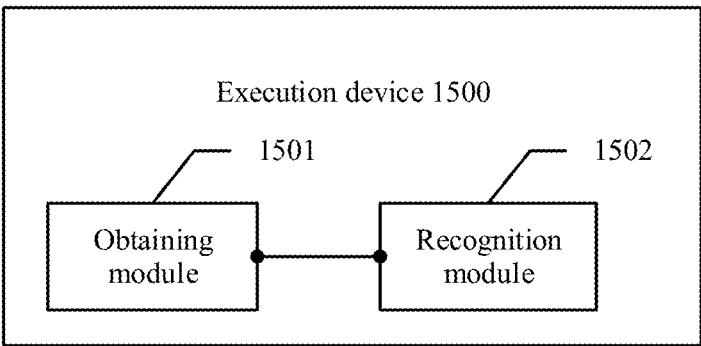
FIG. 15 is a schematic diagram of an execution device according to an embodiment of this application.

An embodiment of this application further provides an execution device. Specifically, FIG. 15 is a schematic diagram of a structure of an execution device according to an embodiment of this application. The execution device 1500 includes an obtaining module 1501 and a recognition module 1502.

The obtaining module 1501 is configured to obtain a target image. The recognition module 1502 is configured to use the target image as an input of the trained semi-supervised learning model, and output the prediction result of the target image. The trained semi-supervised learning model is the second semi-supervised learning model in the foregoing embodiments.

In some embodiments, an application of the trained second semi-supervised learning model is described, that is, the trained second semi-supervised learning model is used to perform category prediction on an image. Compared with a semi-supervised learning model obtained through training by using the existing training method, the semi-supervised learning model provided in this embodiment of this application improves accuracy of target image recognition.

It should be noted that content such as information exchange or an execution process between the modules/units in the execution device 1500 in the embodiment corresponding to FIG. 15 is based on a same concept as the embodiment corresponding to FIG. 10 in this application. For specific content, refer to descriptions in embodiments in this application. Details are not described herein again.

Figure 16:
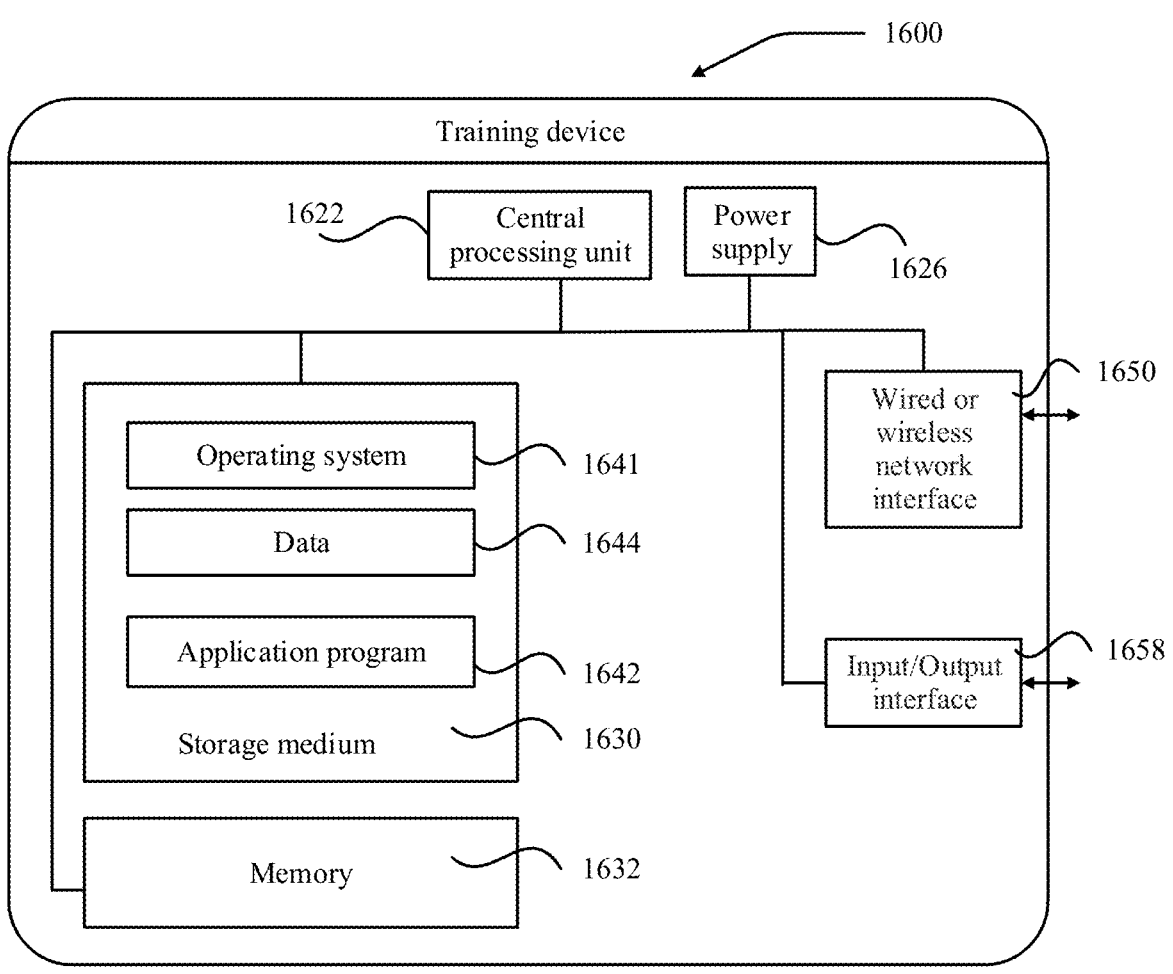
FIG. 16 is another schematic diagram of a training device according to an embodiment of this application.

The following describes a training device provided in embodiments of this application. FIG. 16 is a schematic diagram of a structure of a training device according to an embodiment of this application. The training device 1400 described in the embodiment corresponding to FIG. 14 may be deployed on a training device 1600, and is configured to implement a function of the training device in the embodiments corresponding to FIG. 5 to FIG. 9. Specifically, the training device 1600 is implemented by one or more servers. The training device 1600 may vary greatly with configuration or performance, and may include one or more central processing units (CPU) 1622 (for example, one or more central processing units), a memory 1632, and one or more storage media 1630 (for example, one or more mass storage devices) that store an application program 1642 or data 1644. The memory 1632 and the storage medium 1630 may be transitory storage or persistent storage. The program stored in the storage medium 1630 may include one or more modules (not shown in the figure), and each module may include a series of instruction operations for the training device 1600. Further, the central processing unit 1622 may be configured to communicate with the storage medium 1630, and perform the series of instruction operations in the storage medium 1630 on the training device 1600.

The training device 1600 may further include one or more power supplies 1626, one or more wired or wireless network interfaces 1650, one or more input/output interfaces 1658, and/or one or more operating systems 1641, for example, Windows Server™, Mac OS X™, Unix™, Linux™, and FreeBSD™.

In this embodiment of this application, the central processing unit 1622 is configured to perform the training method for a semi-supervised learning model performed by the training device in the embodiment corresponding to FIG. 7. Specifically, the central processing unit 1622 is configured to first train the initial semi-supervised learning model (which may also be referred to as an initial model) based on the obtained initial training set, to obtain the trained first semi-supervised learning model (which may be referred to as a trained first model). In the initial training set, some samples are labeled samples, and the other are unlabeled samples. The labeled samples are referred to as a first labeled sample set, and the unlabeled samples are referred to as a first unlabeled sample set. After obtaining the trained first model, the central processing unit 1622 selects the initial subset from the first unlabeled sample set in the initial training set, where test data includes unlabeled samples in the initial subset, and is used to test the trained first model; and predicts the unlabeled samples in the selected initial subset by using the trained first model, to obtain a prediction label (the trained first model outputs probability prediction of a classification category of each selected unlabeled sample, and a classification category with a highest probability is usually used as a label of the sample that is predicted by the model) corresponding to each selected unlabeled sample, where the first prediction label set includes prediction labels. After obtaining the first prediction label set, the central processing unit 1622 performs one-bit labeling on the initial subset based on the first prediction label set. The manner provides an amount of information (namely, "yes" or "no") with a $\log_2 2=1$ bit, and therefore is referred to as one-bit labeling. As described above, the one-bit labeling manner is specifically as follows: An annotator answers "yes" or "no" for a prediction label corresponding to each prediction sample. If the prediction label is a classification category that is correctly predicted, a positive label (which may also be referred to as a correct label) of the unlabeled sample is obtained. For example, if a prediction label is "dog", and a true label of the unlabeled sample is also "dog", prediction is correct, and the unlabeled sample obtains a positive label "dog". If the prediction label is a classification category that is incorrectly predicted, a negative label of the unlabeled sample is obtained, and an incorrect label of the unlabeled sample is excluded. For example, if a prediction label is "cat", but a true label of the unlabeled sample is "dog", prediction is incorrect, and the unlabeled sample obtains a negative label "not a cat". After one-bit labeling, the initial subset is divided into a first subset and a second subset. The first subset is a sample set corresponding to a classification category (namely, a positive label) that is correctly predicted, and the second subset is a sample set corresponding to a classification category (namely, a negative label) that is incorrectly predicted. After a one-bit labeling result is obtained, that is, a corresponding quantity of positive labels and negative labels are obtained, the central processing unit 1622 reconstructs a training set, and the reconstructed training set may be referred to as a first training set. A specific construction manner may be using a positive labeled sample (namely, the first subset) and the existing labeled sample as labeled samples in a current phase, the labeled samples may also be referred to as a second labeled sample set; using negative labeled samples (namely, the second subset) as a negative labeled sample set in the current phase; and using remaining unlabeled samples in the first unlabeled sample set as a second unlabeled sample set in the current phase. The first training set includes the three types of samples. After the first training set is constructed, the initial model is retrained based on the first training set, to obtain a trained second semi-supervised learning model (which may be referred to as a trained second model) with a stronger capability.

It should be noted that a specific manner in which the central processing unit 1622 performs the foregoing operations is based on a same concept as the method embodiments corresponding to FIG. 7 in this application. Technical effects brought by the method are the same as those in the method embodiments corresponding to FIG. 7 in this application. For specific content, refer to the descriptions in the foregoing method embodiments in this application. Details are not described herein again.

Figure 17:
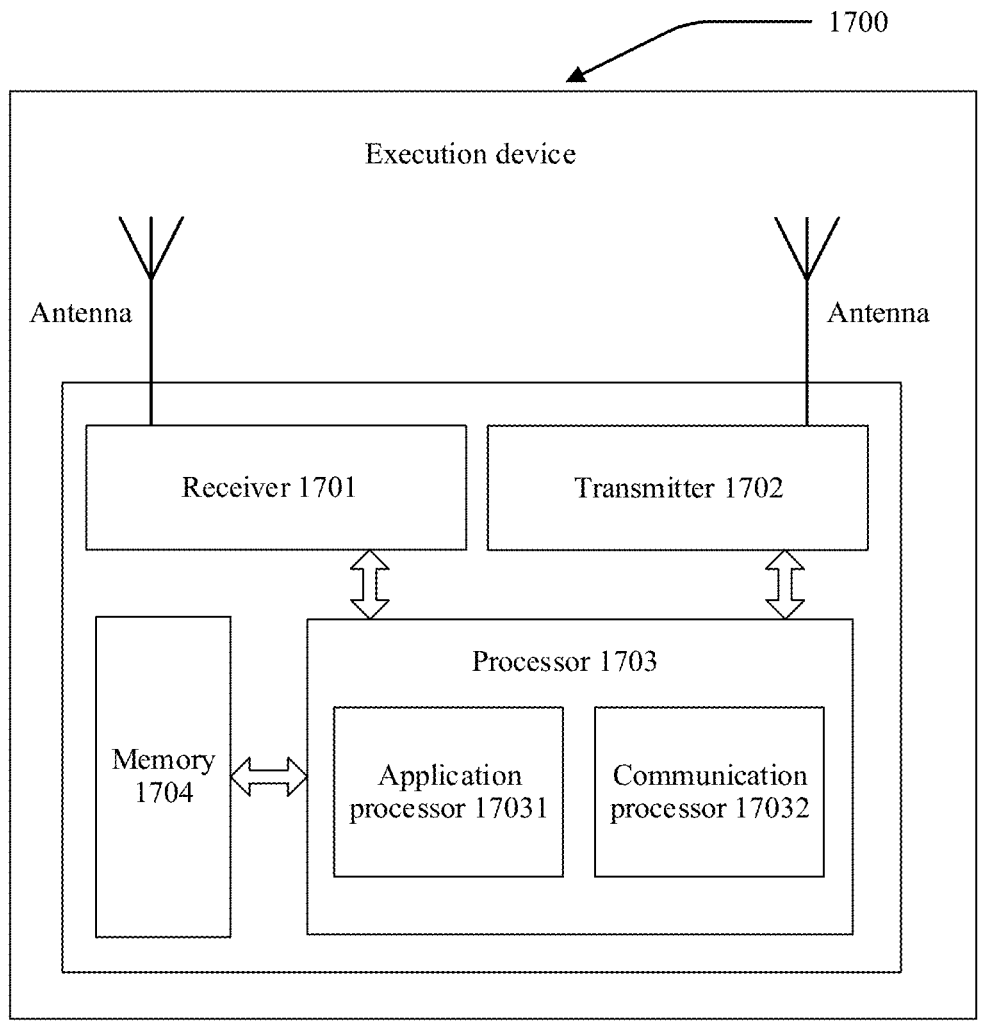
FIG. 17 is another schematic diagram of an execution device according to an embodiment of this application.

The following describes an execution device provided in an embodiment of this application. FIG. 17 is a schematic diagram of a structure of an execution device according to an embodiment of this application. An execution device 1700 may specifically be represented as a terminal device, for example, a virtual reality VR device, a mobile phone, a tablet, a notebook computer, a smart wearable device, a monitoring data processing device, a radar data processing device, or the like. This is not limited herein. The execution device 1500 described in the embodiment corresponding to FIG. 15 may be deployed on the execution device 1700, and is configured to implement a function of the execution device in the embodiment corresponding to FIG. 10. Specifically, the execution device 1700 includes: a receiver 1701, a transmitter 1702, a processor 1703, and a memory 1704 (there may be one or more processors 1703 in the execution device 1700, and one processor is used as an example in FIG. 17). The processor 1703 may include an application processor 17031 and a communication processor 17032. In some embodiments of this application, the receiver 1701, the transmitter 1702, the processor 1703, and the memory 1704 may be connected by using a bus or in another manner.

The memory 1704 may include a read-only memory and a random access memory, and provide instructions and data for the processor 1703. A part of the memory 1704 may further include a nonvolatile random access memory (NVRAM). The memory 1704 stores a processor and operation instructions, an executable module or a data structure, a subnet thereof, or an expanded set thereof. The operation instructions may include various operation instructions to implement various operations.

The processor 1703 controls an operation of the execution device 1700. During specific application, the components of the execution device 1700 are coupled together through a bus system. In addition to a data bus, the bus system may further include a power bus, a control bus, a status signal bus, and the like. However, for clear description, various types of buses in the figure are marked as the bus system.

The method disclosed in the embodiment corresponding to FIG. 4 in this application may be applied to the processor 1703, or may be implemented by the processor 1703. The processor 1703 may be an integrated circuit chip and has a signal processing capability. In an implementation process, various operations in the foregoing method may be completed by using an integrated logic circuit of hardware in the processor 1703 or an instruction in a form of software. The processor 1703 may be a general-purpose processor, a digital signal processor (digital signal processor, DSP), a microprocessor, or a microcontroller. The processor 1703 may further include an application-specific integrated circuit (ASIC), a field programmable gate array (FPGA) or another programmable logic device, a discrete gate, or a transistor logic device, or a discrete hardware component. The processor 1703 may implement or perform the methods, the operations, and logical block diagrams that are disclosed in the embodiment corresponding to FIG. 10 in this application. The general-purpose processor may be a microprocessor, or the processor may be any conventional processor or the like. Operations of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1704, and the processor 1703 reads information in the memory 1704 and completes the operations in the foregoing methods in combination with hardware of the processor.

The receiver 1701 may be configured to receive input digital or character information, and generate a signal input related to setting and function control of the execution device 1700. The transmitter 1702 may be configured to output digital or character information by using a first interface. The transmitter 1702 may further be configured to send instructions to a disk group by using the first interface, to modify data in the disk group. The transmitter 1702 may further include a display device such as a display screen.

An embodiment of this application further provides a computer-readable storage medium. The computer-readable storage medium stores a program used for signal processing. When the program is run on a computer, the computer is enabled to perform the operations performed by the execution device in the method described in the foregoing embodiments.

The training device or the execution device in embodiments of this application may specifically be a chip. The chip includes a processing unit and a communication unit. The processing unit may be, for example, a processor, and the communication unit may be, for example, an input/output interface, a pin, or a circuit. The processing unit may execute computer-executable instructions stored in a storage unit, so that a chip in the training device performs the training method for a semi-supervised learning model described in the embodiments shown in FIG. 5 to FIG. 9, or a chip in the execution device performs the image processing method described in the embodiment shown in FIG. 10. Optionally, the storage unit is a storage unit in the chip, for example, a register or a buffer. Alternatively, the storage unit may be a storage unit in a wireless access device but outside the chip, for example, a read-only memory (ROM), another type of static storage device that can store static information and instructions, or a random access memory (RAM).

Figure 18:
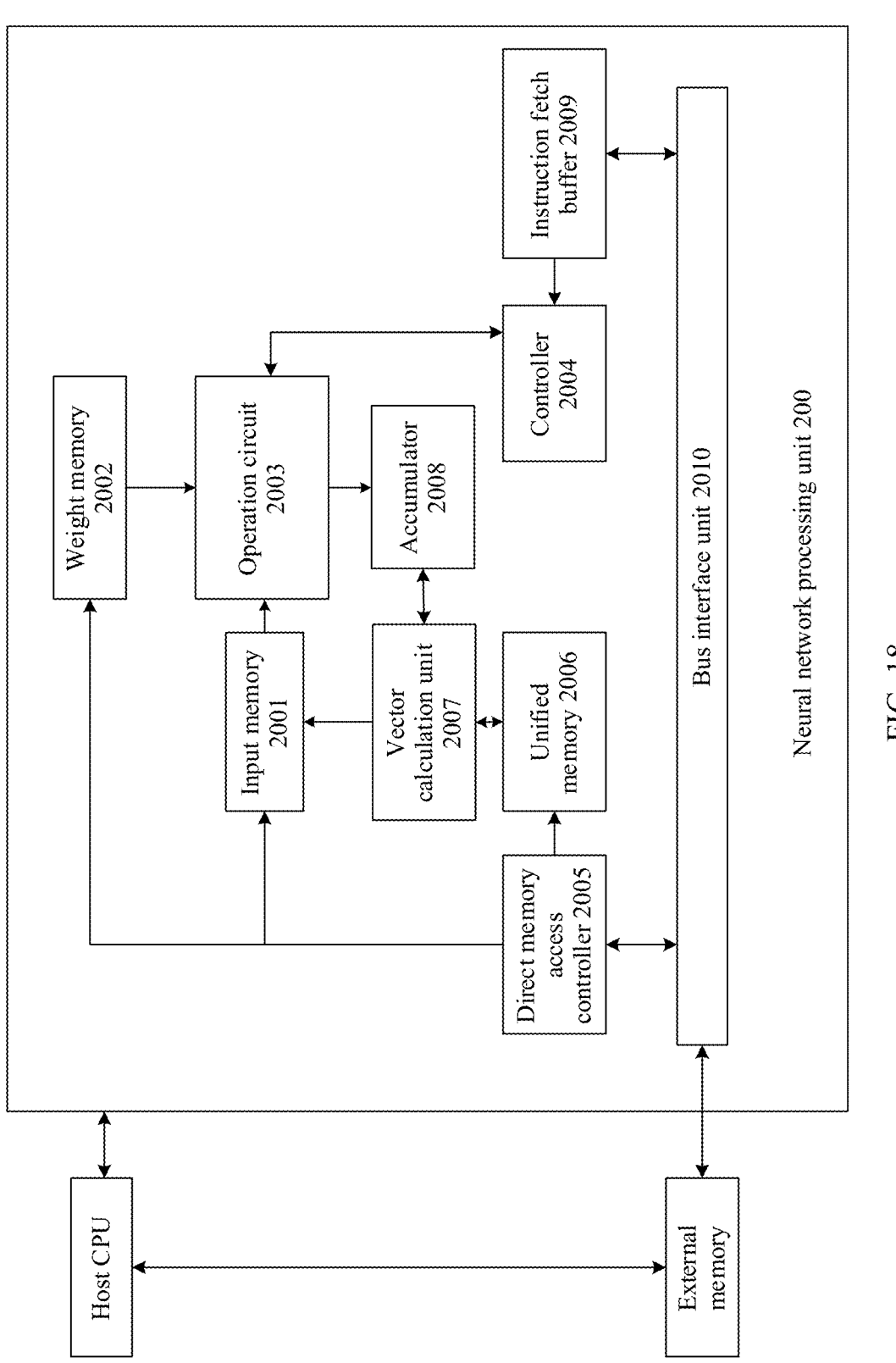
FIG. 18 is a schematic diagram of a structure of a chip according to an embodiment of this application.

Specifically, FIG. 18 is a schematic diagram of a structure of a chip according to an embodiment of this application. The chip may be represented as a neural network processing unit NPU 200. The NPU 200 is mounted to a host CPU as a coprocessor, and the host CPU allocates a task. A core part of the NPU is an operation circuit 2003, and a controller 2004 controls the operation circuit 2003 to extract matrix data in a memory and perform a multiplication operation.

In some implementations, the operation circuit 2003 internally includes a plurality of processing engines (PE). In some implementations, the operation circuit 2003 is a two-dimensional systolic array. The operation circuit 2003 may alternatively be a one-dimensional systolic array or another electronic circuit that can perform mathematical operations such as multiplication and addition. In some implementations, the operation circuit 2003 is a general-purpose matrix processor.

For example, it is assumed that there are an input matrix A, a weight matrix B, and an output matrix C. The operation circuit fetches data corresponding to the matrix B from a weight memory 2002, and buffers the data on each PE in the operation circuit. The operation circuit fetches data of the matrix A from an input memory 2001, to perform a matrix operation on the matrix B, and stores an obtained partial result or an obtained final result of the matrix into an accumulator 2008.

A unified memory 2006 is configured to store input data and output data. Weight data is directly transferred to the weight memory 2002 by using a direct memory access controller (DMAC) 2005. The input data is also transferred to the unified memory 2006 by using the DMAC.

BIU is the abbreviation for bus interface unit. A bus interface unit 2010 is configured to perform interaction between an AXI bus, and the DMAC and an instruction fetch buffer (IFB) 2009.

The bus interface unit 2010 (BIU for short) is configured for the instruction fetch buffer 2009 to obtain instructions from an external memory, and is further configured for the direct memory access controller 2005 to obtain raw data of the input matrix A or the weight matrix B from the external memory.

The DMAC is mainly configured to transfer input data in the external memory DDR to the unified memory 2006, or transfer the weight data to the weight memory 2002, or transfer the input data to the input memory 2001.

A vector calculation unit 2007 includes a plurality of operation processing units. If required, further processing is performed on an output of the operation circuit, for example, vector multiplication, vector addition, an exponential operation, a logarithmic operation, or size comparison. The vector calculation unit 1207 is mainly configured to perform network calculation at a non-convolutional/fully connected layer in a neural network, for example, batch normalization, pixel-level summation, and upsampling on a feature plane.

In some implementations, the vector calculation unit 2007 can store a processed output vector in the unified memory 2006. For example, the vector calculation unit 2007 may apply a linear function or a non-linear function to the output of the operation circuit 2003, for example, perform linear interpolation on a feature plane extracted at a convolutional layer. For another example, the linear function or the non-linear function is applied to a vector of an accumulated value to generate an activation value. In some implementations, the vector calculation unit 2007 generates a normalized value, a pixel-level sum, or a normalized value and a pixel-level sum. In some implementations, the processed output vector can be used as activation input of the operation circuit 2003, for example, to be used in a subsequent layer in the neural network.

The instruction fetch buffer 2009 connected to the controller 2004 is configured to store instructions used by the controller 2004.

The unified memory 2006, the input memory 2001, the weight memory 2002, and the instruction fetch buffer 2009 are all on-chip memories. The external memory is private for a hardware architecture of the NPU.

The processor mentioned anywhere above may be a general-purpose central processing unit, a microprocessor, an ASIC, or one or more integrated circuits that are configured to control program execution of the method according to the first aspect.

In addition, it should be noted that the apparatus embodiments described above are merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of embodiments. In addition, in the accompanying drawings of the apparatus embodiments provided by this application, connection relationships between modules indicate that the modules have communication connections with each other, which may be specifically implemented as one or more communications buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Usually, any function implemented by a computer program may be easily implemented by using corresponding hardware. In addition, specific hardware structures used to implement a same function may be various, for example, an analog circuit, a digital circuit, or a dedicated circuit. However, as for this application, software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a training device, or a network device) to perform the methods described in embodiments of this application.

All or some of the embodiments may be implemented by using software, hardware, firmware, or any combination thereof. When software is used to implement the embodiments, all or a part of the embodiments may be implemented in a form of a computer program product.

The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a training device or a data center, integrating one or more usable media. The usable medium may be a magnetic medium (for example, a floppy disk, a hard disk, or a magnetic tape), an optical medium (for example, a digital video disc, DVD), a semiconductor medium (for example, a solid-state disk (SSD)), or the like.

What is claimed is:

1. A training method for a semi-supervised learning model, comprising:

selecting an initial subset from a first unlabeled sample set, and predicting the initial subset by using a trained first semi-supervised learning model, to obtain a first prediction label set, wherein the first semi-supervised learning model is obtained by training an initial semi-supervised learning model based on an initial training set, and the initial training set comprises a first labeled sample set and the first unlabeled sample set;

dividing the initial subset into a first subset and a second subset based on the first prediction label set, wherein the first subset is a sample set corresponding to a classification category that is correctly predicted, and the second subset is a sample set corresponding to a classification category that is incorrectly predicted;

constructing a first training set, wherein the first training set comprises a second labeled sample set, a second unlabeled sample set, and a negative labeled sample set, the second labeled sample set is a sample set that comprises the first labeled sample set and the first subset and that has a correct classification category, the second unlabeled sample set is an unlabeled sample set in the first unlabeled sample set other than the initial subset, and the negative labeled sample set is a sample set that comprises the second subset and that has an incorrect classification category; and training the initial semi-supervised learning model based on the first training set, to obtain a trained second semi-supervised learning model including:

training the initial semi-supervised learning model based on the second labeled sample set, the second unlabeled sample set, and a first loss function, wherein the first loss function is an original loss function of the initial semi-supervised learning model; and training the initial semi-supervised learning model based on the negative labeled sample set and a second loss function, wherein the second loss function is a difference between a prediction value and a modification value that are output by the initial semi-supervised learning model, and the modification value is a value for setting a dimension, corresponding to the prediction value, of the classification category that is incorrectly predicted to 0.

2. The method according to claim 1, wherein the initial semi-supervised learning model comprises one of the following models:

a pi ($\Pi$)-model, a virtual adversarial training (VAT) model, a label propagation for deep semi-supervised learning (LPDSSL) model, a tangent-normal adversarial regularization (TNAR) model, a pseudo-labeling model, a deep convolutional neural network transfer (DCT) model, and a mean teacher model.

3. The method according to claim 2, wherein the initial semi-supervised learning model is any one of a $\Pi$-model, a VAT model, an LPDSSL model, a TNAR model, a pseudo-labeling model, and a DCT model.

4. The method according to claim 2, wherein the initial semi-supervised learning model is a mean teacher model, and the training the initial semi-supervised learning model based on the first training set, to obtain a trained second semi-supervised learning model comprises:

training the mean teacher model based on the second labeled sample set and a third loss function;

training the mean teacher model based on the second labeled sample set, the second unlabeled sample set, and a fourth loss function, wherein the third loss function and the fourth loss function are original loss functions of the mean teacher model; and training the mean teacher model based on the negative labeled sample set and a fifth loss function, wherein the fifth loss function is a difference between a prediction value and a modification value that are output by the model, and the modification value is a value for setting a dimension, corresponding to the prediction value, of the classification category that is incorrectly predicted to 0.

5. The method according to claim 4, wherein
the third loss function is a cross entropy loss function; and/or
the fourth loss function is a mean squared error loss function.

6. The method according to claim 1, further comprising:
using the second unlabeled sample set as a new first unlabeled sample set, using the second semi-supervised learning model as a new first semi-supervised learning model, and repeatedly performing the selecting, dividing, constructing, and training operations until the second unlabeled sample set is empty.

7. The method according to claim 1, further comprising:
after the training the initial semi-supervised learning model based on the first training set to obtain a trained second semi-supervised learning model, deploying the trained second semi-supervised learning model on a target device, wherein the target device is configured to obtain a target image, and the trained second semi-supervised learning model is used to perform label prediction on the target image.

8. The method according to claim 1, wherein the selecting an initial subset from a first unlabeled sample set comprises:
randomly selecting a preset quantity of unlabeled samples from the first unlabeled sample set, to form the initial subset.

9. An image processing method, comprising:
obtaining a target image; and
using the target image as an input of a trained semi-supervised learning model, and outputting a prediction result of the target image, wherein the trained semi-supervised learning model is a trained second semi-supervised learning model obtained by:
selecting an initial subset from a first unlabeled sample set, and predicting the initial subset by using a trained first semi-supervised learning model, to obtain a first prediction label set, wherein the first semi-supervised learning model is obtained by training an initial semi-supervised learning model based on an initial training set, and the initial training set comprises a first labeled sample set and the first unlabeled sample set;
dividing the initial subset into a first subset and a second subset based on the first prediction label set, wherein the first subset is a sample set corresponding to a classification category that is correctly predicted, and the second subset is a sample set corresponding to a classification category that is incorrectly predicted;
constructing a first training set, wherein the first training set comprises a second labeled sample set, a second unlabeled sample set, and a negative labeled sample set, the second labeled sample set is a sample set that comprises the first labeled sample set and the first subset and that has a correct classification category, the second unlabeled sample set is an unlabeled sample set in the first unlabeled sample set other than the initial subset, and the negative labeled sample set is a sample set that comprises the second subset and that has an incorrect classification category; and
training the initial semi-supervised learning model based on the first training set, to obtain the trained second semi-supervised learning model, including:
training the initial semi-supervised learning model based on the second labeled sample set, the second unlabeled sample set, and a first loss function, wherein the first loss function is an original loss function of the initial semi-supervised learning model; and
training the initial semi-supervised learning model based on the negative labeled sample set and a second loss function, wherein the second loss function is a difference between a prediction value and a modification value that are output by the initial semi-supervised learning model, and the modification value is a value for setting a dimension, corresponding to the prediction value, of the classification category that is incorrectly predicted to 0.

10. The method according to claim 9, wherein the initial semi-supervised learning model comprises one of the following models:
a pi (Π)-model, a virtual adversarial training (VAT) model, a label propagation for deep semi-supervised learning (LPDSSL) model, a tangent-normal adversarial regularization (TNAR) model, a pseudo-labeling model, a deep convolutional neural network transfer (DCT) model, and a mean teacher model.

11. The method according to claim 10,
wherein the initial semi-supervised learning model is any one of a Π-model, a VAT model, an LPDSSL model, a TNAR model, a pseudo-labeling model, and a DCT model.

12. The method according to claim 10, wherein the initial semi-supervised learning model is a mean teacher model, and the training the initial semi-supervised learning model based on the first training set, to obtain a trained second semi-supervised learning model comprises:
training the mean teacher model based on the second labeled sample set and a third loss function;
training the mean teacher model based on the second labeled sample set, the second unlabeled sample set, and a fourth loss function, wherein the third loss function and the fourth loss function are original loss functions of the mean teacher model; and
training the mean teacher model based on the negative labeled sample set and a fifth loss function, wherein the fifth loss function is a difference between a prediction value and a modification value that are output by the model, and the modification value is a value for setting a dimension, corresponding to the prediction value, of the classification category that is incorrectly predicted to 0.

13. The method according to claim 12, wherein
the third loss function is a cross entropy loss function; and/or
the fourth loss function is a mean squared error loss function.

14. The method according to claim 9, further comprising:
using the second unlabeled sample set as a new first unlabeled sample set, using the second semi-supervised learning model as a new first semi-supervised learning model, and repeatedly performing the selecting, dividing, constructing, and training operations until the second unlabeled sample set is empty.

15. The method according to claim 9, further comprising:
after the training the initial semi-supervised learning model based on the first training set to obtain a trained second semi-supervised learning model, deploying the trained second semi-supervised learning model on a target device, wherein the target device is configured to obtain a target image, and the trained second semi-supervised learning model is used to perform label prediction on the target image.

16. The method according to claim 9, wherein the selecting an initial subset from a first unlabeled sample set comprises:

randomly selecting a preset quantity of unlabeled samples from the first unlabeled sample set, to form the initial subset.

17. A training device, comprising a processor and a memory, wherein the processor is coupled to the memory;

the memory is configured to store instructions; and the processor is configured to execute the instructions in the memory, to cause the training device to perform:

selecting an initial subset from a first unlabeled sample set, and predicting the initial subset by using a trained first semi-supervised learning model, to obtain a first prediction label set, wherein the first semi-supervised learning model is obtained by training an initial semi-supervised learning model based on an initial training set, and the initial training set comprises a first labeled sample set and the first unlabeled sample set;

dividing the initial subset into a first subset and a second subset based on the first prediction label set, wherein the first subset is a sample set corresponding to a classification category that is correctly predicted, and the second subset is a sample set corresponding to a classification category that is incorrectly predicted;

constructing a first training set, wherein the first training set comprises a second labeled sample set, a second unlabeled sample set, and a negative labeled sample set, the second labeled sample set is a sample set that comprises the first labeled sample set and the first subset and that has a correct classification category, the second unlabeled sample set is an unlabeled sample set in the first unlabeled sample set other than the initial subset, and the negative labeled sample set is a sample set that comprises the second subset and that has an incorrect classification category; and training the initial semi-supervised learning model based on the first training set, to obtain a trained second semi-supervised learning model, including:

training the initial semi-supervised learning model based on the second labeled sample set, the second unlabeled sample set, and a first loss function, wherein the first loss function is an original loss function of the initial semi-supervised learning model; and training the initial semi-supervised learning model based on the negative labeled sample set and a second loss function, wherein the second loss function is a difference between a prediction value and a modification value that are output by the initial semi-supervised learning model, and the modification value is a value for setting a dimension, corresponding to the prediction value, of the classification category that is incorrectly predicted to 0.

18. The training device according to claim 17, wherein the initial semi-supervised learning model comprises one of the following models:

a pi (Π)-model, a VAT model, a label propagation for deep semi-supervised learning (LPDSSL) model, a tangent-normal adversarial regularization (TNAR) model, a pseudo-labeling model, a deep convolutional neural network transfer (DCT) model, and a mean teacher model.

19. The training device according to claim 18, wherein the initial semi-supervised learning model is any one of a Π-model, a VAT model, an LPDSSL model, a TNAR model, a pseudo-labeling model, and a DCT model.

20. The training device according to claim 18, wherein the initial semi-supervised learning model is a mean teacher model, and the training the initial semi-supervised learning model based on the first training set, to obtain a trained second semi-supervised learning model comprises:

training the mean teacher model based on the second labeled sample set and a third loss function;

training the mean teacher model based on the second labeled sample set, the second unlabeled sample set, and a fourth loss function, wherein the third loss function and the fourth loss function are original loss functions of the mean teacher model; and training the mean teacher model based on the negative labeled sample set and a fifth loss function, wherein the fifth loss function is a difference between a prediction value and a modification value that are output by the model, and the modification value is a value for setting a dimension, corresponding to the prediction value, of the classification category that is incorrectly predicted to 0.

21. The training device according to claim 20, wherein the third loss function is a cross entropy loss function; and/or the fourth loss function is a mean squared error loss function.

22. The training device according to claim 17, wherein the instructions further cause the training device to perform:

using the second unlabeled sample set as a new first unlabeled sample set, using the second semi-supervised learning model as a new first semi-supervised learning model, and repeatedly performing the selecting, dividing, constructing, and training operations until the second unlabeled sample set is empty.

23. The training device according to claim 17, wherein the instructions further cause the training device to perform:

after the training the initial semi-supervised learning model based on the first training set to obtain a trained second semi-supervised learning model, deploying the trained second semi-supervised learning model on a target device, wherein the target device is configured to obtain a target image, and the trained second semi-supervised learning model is used to perform label prediction on the target image.

24. The training device according to claim 17, wherein the selecting an initial subset from a first unlabeled sample set comprises:

randomly selecting a preset quantity of unlabeled samples from the first unlabeled sample set, to form the initial subset.

25. A non-transitional computer-readable storage medium storing instructions, wherein when the instructions of the computer-readable storage medium are executed by one or more processors, the processors are caused to perform:

selecting an initial subset from a first unlabeled sample set, and predicting the initial subset by using a trained first semi-supervised learning model, to obtain a first prediction label set, wherein the first semi-supervised learning model is obtained by training an initial semi-supervised learning model based on an initial training set, and the initial training set comprises a first labeled sample set and the first unlabeled sample set;

dividing the initial subset into a first subset and a second subset based on the first prediction label set, wherein the first subset is a sample set corresponding to a classification category that is correctly predicted, and the second subset is a sample set corresponding to a classification category that is incorrectly predicted;

constructing a first training set, wherein the first training set comprises a second labeled sample set, a second unlabeled sample set, and a negative labeled sample set, the second labeled sample set is a sample set that comprises the first labeled sample set and the first subset and that has a correct classification category, the second unlabeled sample set is an unlabeled sample set in the first unlabeled sample set other than the initial subset, and the negative labeled sample set is a sample set that comprises the second subset and that has an incorrect classification category; and training the initial semi-supervised learning model based on the first training set, to obtain a trained second semi-supervised learning model, including:

training the initial semi-supervised learning model based on the second labeled sample set, the second unlabeled sample set, and a first loss function, wherein the first loss function is an original loss function of the initial semi-supervised learning model; and training the initial semi-supervised learning model based on the negative labeled sample set and a second loss function, wherein the second loss function is a difference between a prediction value and a modification value that are output by the initial semi-supervised learning model, and the modification value is a value for setting a dimension, corresponding to the prediction value, of the classification category that is incorrectly predicted to 0.

26. The computer-readable storage medium according to claim 25, wherein the initial semi-supervised learning model comprises one of the following models:

a pi (Π)-model, a virtual adversarial training (VAT) model, a label propagation for deep semi-supervised learning (LPDSSL) model, a tangent-normal adversarial regularization (TNAR) model, a pseudo-labeling model, a deep convolutional neural network transfer (DCT) model, and a mean teacher model.

27. The computer-readable storage medium according to claim 26, wherein the initial semi-supervised learning model is any one of a Π-model, a VAT model, an LPDSSL model, a TNAR model, a pseudo-labeling model, and a DCT model.

28. The computer-readable storage medium according to claim 26, wherein the initial semi-supervised learning model is a mean teacher model, and the training the initial semi-supervised learning model based on the first training set, to obtain a trained second semi-supervised learning model comprises:

training the mean teacher model based on the second labeled sample set and a third loss function;

training the mean teacher model based on the second labeled sample set, the second unlabeled sample set, and a fourth loss function, wherein the third loss function and the fourth loss function are original loss functions of the mean teacher model; and training the mean teacher model based on the negative labeled sample set and a fifth loss function, wherein the fifth loss function is a difference between a prediction value and a modification value that are output by the model, and the modification value is a value for setting a dimension, corresponding to the prediction value, of the classification category that is incorrectly predicted to 0.

29. The computer-readable storage medium according to claim 28, wherein the third loss function is a cross entropy loss function; and/or the fourth loss function is a mean squared error loss function.

30. The computer-readable storage medium according to claim 25, wherein the instructions further cause the processors to perform:

using the second unlabeled sample set as a new first unlabeled sample set, using the second semi-supervised learning model as a new first semi-supervised learning model, and repeatedly performing the selecting, dividing, constructing, and training operations until the second unlabeled sample set is empty.

* * * * *